United States Patent
Sahin et al.

(10) Patent No.: US 12,267,890 B2
(45) Date of Patent: Apr. 1, 2025

(54) MULTI-OPERATOR MARITIME MESH NETWORK

(71) Applicant: Telefonaktiebolaget LM Ericsson (publ), Stockholm (SE)

(72) Inventors: Serdar Sahin, Plano, TX (US); Lars Pedersen, Bagsvaerd (DK); Yanping Dang, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 480 days.

(21) Appl. No.: 17/597,991

(22) PCT Filed: Nov. 23, 2019

(86) PCT No.: PCT/IB2019/060091
§ 371 (c)(1),
(2) Date: Feb. 1, 2022

(87) PCT Pub. No.: WO2021/024032
PCT Pub. Date: Feb. 11, 2021

(65) Prior Publication Data
US 2022/0338279 A1    Oct. 20, 2022

(30) Foreign Application Priority Data
Aug. 2, 2019  (WO) ................ PCT/CN2019/099039

(51) Int. Cl.
*H04W 48/18*    (2009.01)
*H04B 7/185*    (2006.01)
(Continued)

(52) U.S. Cl.
CPC ........ *H04W 76/12* (2018.02); *H04B 7/18513* (2013.01); *H04L 12/4641* (2013.01);
(Continued)

(58) Field of Classification Search
None
See application file for complete search history.

(56) References Cited

U.S. PATENT DOCUMENTS

| | | | | |
|---|---|---|---|---|
| 2002/0072328 A1* | 6/2002 | Guirauton | .......... | H04B 7/18563 455/422.1 |
| 2015/0288622 A1* | 10/2015 | Fargano | .................... | G06F 9/50 370/401 |

(Continued)

FOREIGN PATENT DOCUMENTS

| | | |
|---|---|---|
| WO | 2017037510 A1 | 3/2017 |
| WO | 2019130047 A1 | 7/2019 |

OTHER PUBLICATIONS

International Search Report and Written Opinion for Application No. PCT/IB2019/060091, dated Apr. 24, 2020, 16 pages.
(Continued)

*Primary Examiner* — Jenkey Van
(74) *Attorney, Agent, or Firm* — Nicholson De Vos Webster & Elliott LLP

(57) ABSTRACT

A method is implemented by a network device to establish secure communication over a maritime mesh network. The network device is in a local network of a communication system of a vessel in the maritime mesh network. The method includes receiving a communication session request from a local user device to access a remote service, determining whether the remote service is accessible via a terrestrial network available over the maritime mesh network, and establishing a secure tunnel between the network device and the terrestrial network for the communication session, in response to determining the remote service is accessible via the terrestrial network.

11 Claims, 13 Drawing Sheets

(51) Int. Cl.
    *H04L 12/46*     (2006.01)
    *H04W 12/088*     (2021.01)
    *H04W 76/12*     (2018.01)
    *H04W 84/18*     (2009.01)

(52) U.S. Cl.
    CPC ......... *H04W 12/088* (2021.01); *H04W 48/18* (2013.01); *H04W 84/18* (2013.01)

(56) References Cited

U.S. PATENT DOCUMENTS

| | | | |
|---|---|---|---|
| 2017/0135095 A1* | 5/2017 | Chandwani | H04W 72/541 |
| 2018/0063753 A1* | 3/2018 | Cao | H04W 76/12 |
| 2020/0314794 A1* | 10/2020 | Ly | B63B 22/16 |

OTHER PUBLICATIONS

Invitation to Pay Additional Fees for Application No. PCT/IB2019/060091, dated May 4, 2021, 3 pages.

Written Opinion of the International Preliminary Examining Authority for Application No. PCT/IB2019/060091, dated Jun. 10, 2021, 11 pages.

International Preliminary Report on Patentability for Application No. PCT/IB2019/060091, dated Sep. 1, 2021, 19 pages.

Roksana Boreli et al., "Intelligent Middleware for High Speed Maritime Mesh Networks with Satellite Communications," 2009, pp. 370-375, IEEE.

Liping Mu et al., "An Integrated Wireless Communication Architecture for Maritime Sector," 2011, pp. 193-205, Springer-Verlag Berlin Heidelberg.

Voice over IP, Wikipedia, Jul. 23, 2019, 20 pages, downloaded from https://en.wikipedia.org/w/index.php?title=Voice_over_IP&oldid=907533346.

IPsec, Wikipedia, Jul. 28, 2019, 7 pages, downloaded from https://en.wikipedia.org/w/index.php?title=IPsec&oldid=908214031.

\* cited by examiner

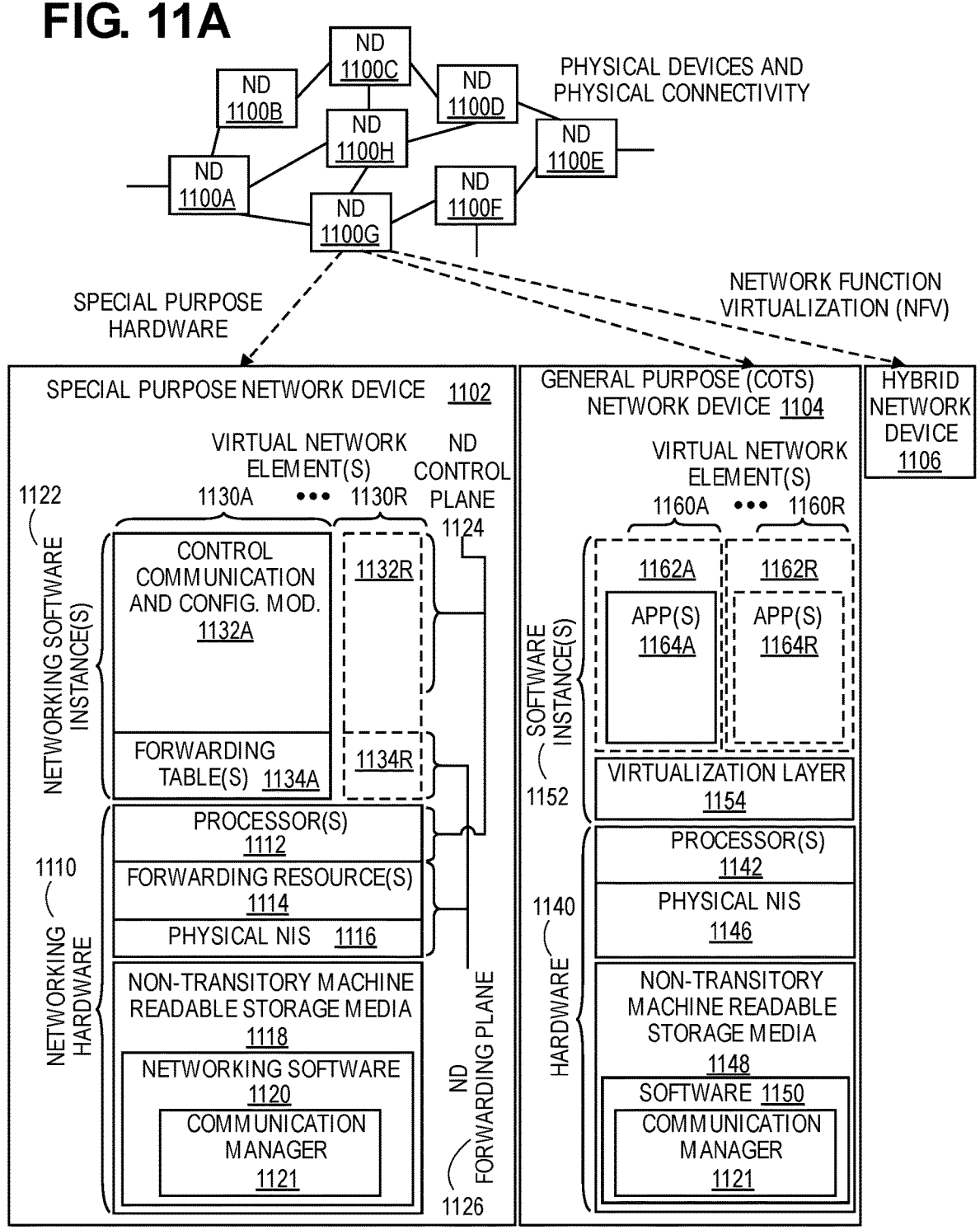

MULTI-OPERATOR MARITIME MESH NETWORK

CROSS-REFERENCE TO RELATED APPLICATIONS

This application is a National stage of International Application No. PCT/IB2019/060091, filed Nov. 23, 2019, which claims priority to International Application No. PCT/CN2019/099039, filed Aug. 2, 2019, which are hereby incorporated by reference.

TECHNICAL FIELD

Embodiments of the invention relate to the field of maritime communications; and more specifically, to a process and system for multi-operator maritime mesh network.

BACKGROUND ART

Computing devices aboard a maritime vessel communicate with remote computing devices (i.e., computing devices external to the maritime vessel) via terrestrial networks, or satellite networks when the maritime vessel is out of reach of the terrestrial networks (or in other special conditions). For instance, when out of range of the terrestrial networks, computing devices on the maritime vessel will connect to a base station on the maritime vessel, which in turn is connected via a satellite network to a core network somewhere on land. The connection decision, whether to connect via a satellite or a terrestrial network, is based on the vessel's proximity to the terrestrial networks (i.e., whether the vessel is in range of the terrestrial network).

The communication systems of maritime vessels, however, do not take advantage of the capabilities of the communication systems of other maritime vessels in close proximity to create opportunities for more cost effective and efficient communication therebetween and, ultimately, to the terrestrial networks. It is not uncommon for a maritime vessel to lose satellite connectivity because the heading of the maritime vessel interferes with a line of sight to the satellite such that the satellite communication equipment onboard the maritime vessel is unable to maintain communication with the satellite. Additionally, the communication systems aboard maritime vessels do not take into account national jurisdictions with respect to the location of the maritime vessels, and associated potential ad hoc networks, to send and receive information both legally and efficiently.

SUMMARY

In one embodiment, a method is implemented by a network device to establish secure communication over a maritime mesh network. The network device is in a local network of a communication system of a vessel in the maritime mesh network. The method includes receiving a communication session request from a local user device to access a remote service, determining whether the remote service is accessible via a terrestrial network available over the maritime mesh network, and establishing a secure tunnel between the network device and the terrestrial network for the communication session, in response to determining the remote service is accessible via the terrestrial network.

In another embodiment, a method is implemented by a network device to establish communication over a multi-operator maritime mesh network. The network device is in a local network of a communication system of a vessel in the maritime mesh network. The method includes receiving a communication session request from a remote network device to access a remote service, querying a subscriber database of a network operator associated with the remote network device, determining whether the remote network device has a roaming agreement with a network operator associated with the network device, and establishing a communication session between the remote network device and the remote service, in response to determining the remote network device has the roaming agreement with the network operator associated with the network device.

BRIEF DESCRIPTION OF THE DRAWINGS

The invention may best be understood by referring to the following description and accompanying drawings that are used to illustrate embodiments of the invention. In the drawings:

FIG. 11A illustrates connectivity between network devices (NDs) within an exemplary network, as well as three exemplary implementations of the NDs, according to some embodiments of the invention.

FIG. 11B illustrates an exemplary way to implement a special-purpose network device according to some embodiments of the invention.

DETAILED DESCRIPTION

Figure 1:
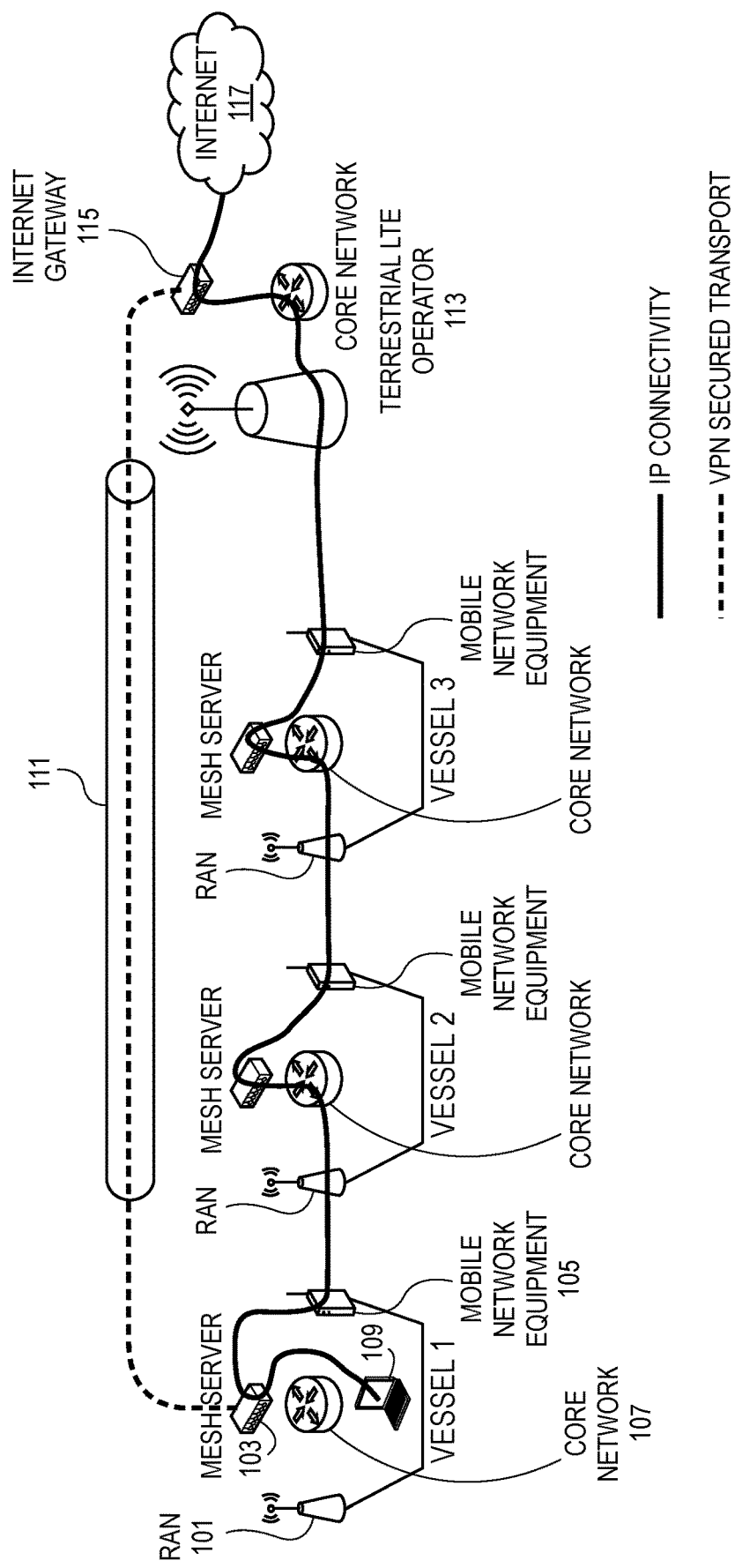
FIG. 1 is a diagram of one embodiment of a mesh network with a virtual private network (VPN) including three maritime vessels and a terrestrial network.

The following description describes methods and apparatus for a multi-operator mesh maritime network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Current communication systems aboard maritime vessels do not take advantage of the fact that the maritime vessels can be in proximity to each other and that, via a path through one or more communication systems of other maritime vessels, there is a more optimum way to communicate from either a bandwidth or a cost point of view. The communication systems of maritime vessels are generally reliant on satellite based communication. However, it is not uncommon for a maritime vessel to lose satellite connectivity because of the heading of the maritime vessel such that the line of sight to the satellite is blocked by structures on board the maritime vessel.

The embodiments disclosed herein provide a maritime mesh network that improves on existing maritime vessel communication options by creating ad hoc mesh networks that change as the position of vessels relative to each other changes. One or more communication paths via the communication systems of the local maritime vessels are created and torn down dynamically depending on the connection status of each communication system aboard each maritime vessel. Data to and from the communication systems of each vessel is routed across the appropriate communication path dynamically.

The embodiments further enable a multi-operator cellular maritime environment where vessels can roam from one operator's mesh to another and mesh networks can even be formed from segments from multiple operators. The embodiments provide enhanced security of the data traffic across the ad hoc mesh network by tunneling the data from the communication system of an originating vessel all the way to the anchor terrestrial operator for that connection, preventing any eavesdropping throughout the intermediate nodes in the ad hoc mesh network.

Many technologies like Third Generation Partnership Program (3GPP) standard Long Term Evolution (LTE) and WiMAX do not allow transmission from one mobile communication system to another mobile communication system, and as such, each vessel needs to be equipped with all the equipment that a full segment of an network operator would have, i.e., a radio antenna, base station (e.g., an evolved node B (eNodeB)), and core network, in addition to a mesh server as well as mobile network equipment.

FIG. 1 is a diagram of one example embodiment of a maritime mesh network. Each vessel includes a full segment including a radio access network (RAN) 101, and core network 107, which are similar to components in terrestrial network operator components. In the example architecture, each vessel also includes mobile network equipment 105 and a mesh server 103. These components, referred to herein as a communication system of a maritime vessel, enable a computing device such as a user device 109 to connect with the communication system either via the RAN 101 or directly through the core network 107, to establish communication sessions with services external to the communication system of the maritime vessel including communicating with services in other communication systems of other maritime vessels in a mesh network or with services accessible via terrestrial network operator 113 and/or the Internet 117. The communication system of each maritime vessel can also relay data traffic as part of the mesh network received via its respective RAN 101 and retransmitted via its respective mobile network equipment 105.

In addition, the communication system of each vessel can support the creation of a secure tunnel to a terrestrial network operator 113 (e.g., a terrestrial LTE operator). This secure tunnel can be a virtual private network (VPN) or similar secure tunneling mechanism. The mesh server 103 of the communication system can establish a VPN or similar secure tunnel to an Internet Gateway 115 of the terrestrial network operator 113 to ensure that the data traffic remains secure and private and thereby guarantee that relaying communication systems of intermediate maritime vessels in the mesh network can be trusted not to monitor or manipulate the data traffic being relayed by those communication systems.

In some embodiments, the mobile network equipment in the communication system of each vessel is provisioned. Provisioning the mobile network equipment can be completed dynamically by using local satellite connections attached to the communication system of each vessel as each communication system of a vessel is added to the mesh network. In other embodiments, the terrestrial network operator subscriber database is utilized for provisioning by connecting to it using a local satellite link or a satellite link available in the mesh network. Utilization of local or mesh satellite connections can lower the cost of managing the mesh network, but increases reliance on satellite connections, which can be slower and unreliable.

In the case of communication systems deploying 3GPP technologies (e.g., 3GPP LTE), it is also possible to allow a roaming-like arrangement if multiple operators are operating different instances of the network, by allowing queries via satellite link to home operator subscriber databases (e.g., home locations register (HLR), home subscriber server (HSS), and similar 3GPP network components). This roaming arrangement can allow each terrestrial network operator, if they choose so, to extend their cellular network to the maritime communication systems of the vessels, similar to a full segment in a terrestrial network, but with a moving and dynamic architecture as the nodes of the 3GPP network in each vessel will be moving along with the vessel whereas terrestrial network nodes are fixed in one place.

In another embodiment, even if the mesh network cannot be established all the way to the terrestrial operator at a given time, a decentralized asynchronous file sharing mechanism can be used where devices connected to the communications systems of the vessels in the current mesh network can have email, social network, media and file sharing in an intermittent connection environment. The mesh network in this embodiment can enable transfers of user digital assets (e.g., email, social network, media, file, and similar assets) to any communication of any vessel in the current mesh network. These transfers can be to any communication system of any vessel connected to the mesh network whenever there is some connection established between any two communication systems of vessels, effectively broadcasting the digital asset. Then when any of the communication systems are able to reach a terrestrial network operator the digital asset can be forwarded to the Internet Gateway. Such broadcasts can be tracked with a maximum hop counter to prevent loops and then the broadcast terminated, and intermediary copies of files are deleted, after some time has expired, max hops achieved or confirmation received from the Internet Gateway for the receipt of the digital asset. The digital asset is also encrypted between the originating Mesh Server and Internet Gateway.

In a further embodiment, spare satellite connectivity may be shared between vessels even if the mesh network cannot be established all the way to the terrestrial network operator. For example, a communication system of vessel 1 may connect to the communication system of vessel 2, which in turn is connected to the communication system of vessel 3 as part of the mesh network. In this example, the communication system of vessel 3 can include a high speed satellite connection. The communication system of vessel 3 can enable the mesh network to be shared for Internet connectivity.

FIG. 1 shows an example of a maritime mesh network where Internet Protocol (IP) connectivity is established between the communication system of vessel 1, specifically from the mesh server 103 through the mobile network equipment 105 to the RAN in vessel 2, and then repeating the same path in the communication system of vessel 2 to vessel 3 and from the communication system of vessel 3 to the terrestrial LTE network operator 113, and finally to Internet Gateway 115. As shown in FIG. 1, each vessel communication system has a communication system that is a full segment of the network operator including a RAN, core network, as well as, a mesh server and mobile network equipment. Once IP connectivity is established from the mesh server 103 in vessel 1 to the Internet Gateway 115, a VPN 111 is established between the mesh server 103 and Internet Gateway 115 to protect the data traffic from monitoring or manipulation by bad agents in intermediary vessel communication systems.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2:
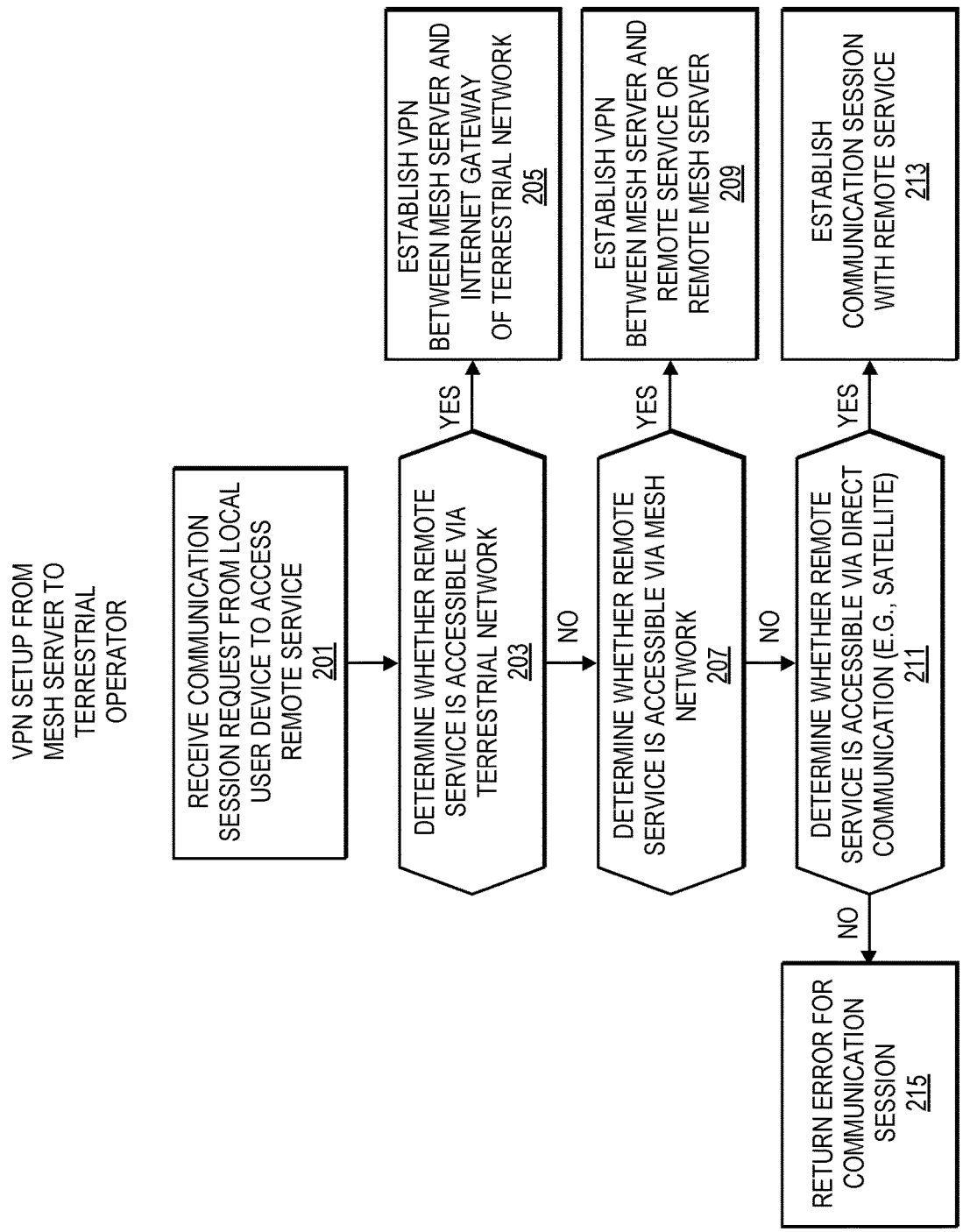
FIG. 2 is a flowchart of one embodiment of a process for establishing a VPN between a mesh server of a maritime vessel and a terrestrial operator.

FIG. 2 is a flowchart of one embodiment of a process for establishing secured communication between a communication system of a maritime vessel and a terrestrial network. In one embodiment, the secured communication is established by a mesh server or similar component of the vessel communication system. The secured communication can be via an encrypted tunneling technology such as a VPN. An Internet Gateway can serve as the endpoint of the secured communication within a terrestrial network of a network operator associated with the first vessel (e.g., a network operator that has a subscription agreement with the operators of the first vessel).

The process can be initiated by the mesh server or similar component of the vessel communication session in response to receiving a request for a communication session from a user device (Block 201). The functions to establish the communication session can be implemented by a communication manager or similar component within the communication system (e.g., where the communication manager is a function of the mesh server). The user device can be connected to the communication system of the first vessel via the RAN or core network of the communication system. The request from the user device can indicate a remote service that is to be accessed by the user device. A remote service can be any type of service including accessing a web server, a remote application, file transfer, or similar service. The remote service can be accessible via a terrestrial network and/or the Internet. In other embodiments the remote service can be within the mesh network. In response to receiving the communication session request, the communication manager determines whether the remote service is accessible via a terrestrial network accessible via the mesh network (Block 203). The mesh server maintains information about terrestrial networks connected to the mesh network. Where a terrestrial network is accessible, then a VPN for the communication session is established between the mesh server and the internet gateway of the terrestrial network (Block 205). In one embodiment, where multiple terrestrial networks are accessible via the mesh network, then the terrestrial network associated with a network operator that the vessel operator has a subscription or similar agreement with is chosen.

If no terrestrial network is available, then a check of the mesh network is made to determine whether the remote service is accessible within the mesh network (Block 207). This can include a case where one of the communication systems in the mesh network has intermittent connections with a terrestrial network. In this case, a VPN for the communication session is established between the mesh server and a remove mesh server of the communication system where the remote service is available (Block 209). If the remote service is not accessible via the mesh network and/or a terrestrial network, then a check is made to determine if a direct communication system (e.g., satellite link) is available either within the vessel communication system or as a shared resource in the mesh network (Block 211). Where a satellite communication or similar direct communication system is available, then the communication session can be established using this direct communication system (Block 213). If the direct communication system does not provide access to the requested remote service, then the process returns an error to the requesting user device (Block 215). The error can indicate the remote service is unavailable or provide other feedback to the user device that generated a request. In some embodiments, the process can be retried over any duration of time as the availability of terrestrial networks and direct communication systems can change over time.

Figure 3:
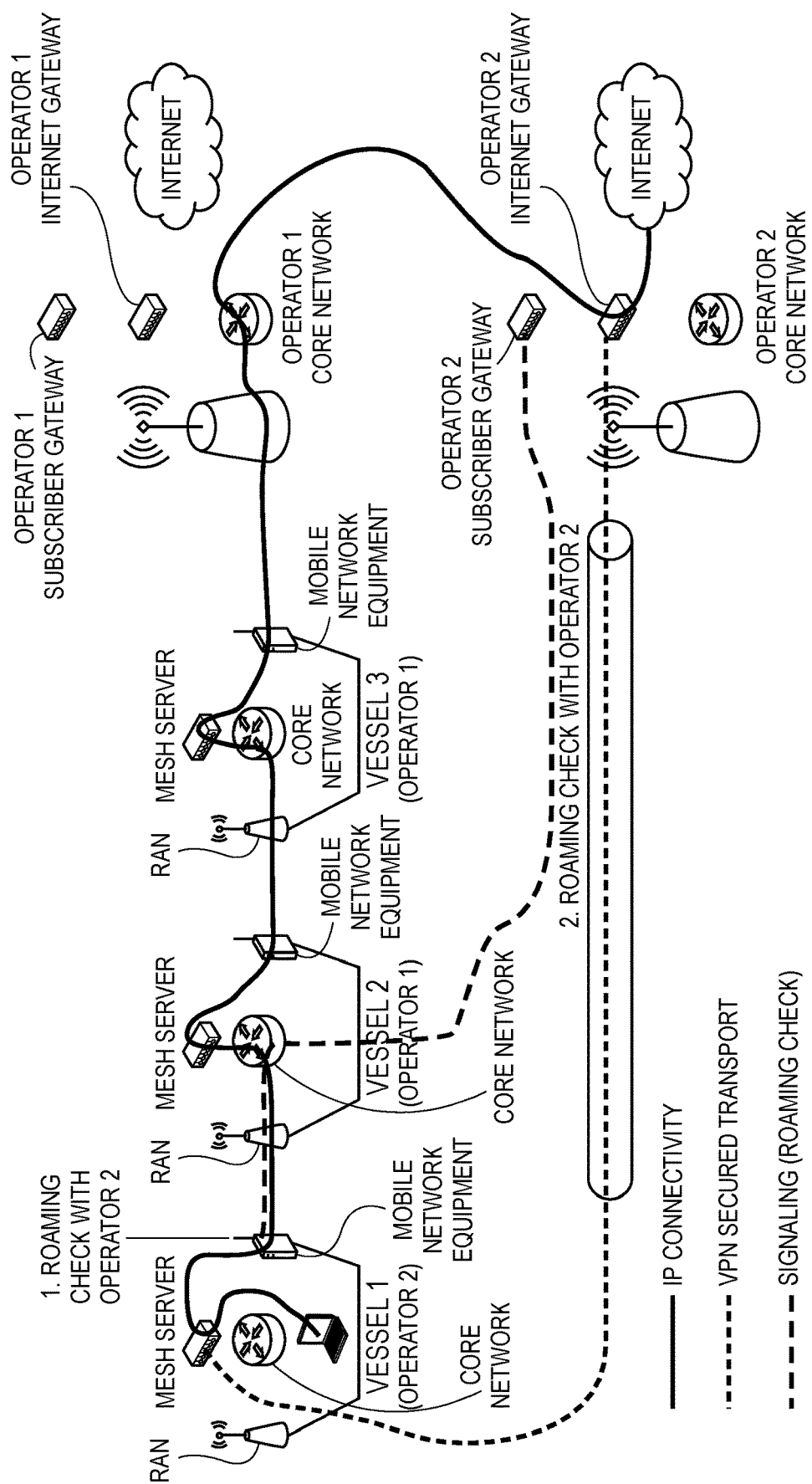
FIG. 3 is a diagram of one embodiment of a mesh network that supports roaming services in a multi-operator scenario involving the communication systems of maritime vessels.

FIG. 3 is a diagram of one embodiment of a mesh network that supports roaming services in a multi-operator scenario involving the communication systems of maritime vessels. In this example embodiment, vessel 1 which has an agreement for using the services of network operator 2 is connecting to the network operator 2 via the mesh network including via vessels 2 and 3 which have an agreement to use services provided by network operator 1, by means of using roaming procedures. This example embodiment demonstrates support for multi-operator scenarios. In these cases, when a vessel connects with a mesh network or starts to use the mesh network, then a connection between the communication system of the connecting vessel and the terrestrial network of the network operator with which the operator of this vessel has a service agreement is established. For example, when the communication system of vessel 1 connects with the communication system of vessel 2, the communication system (e.g., the mesh server) of vessel 2 checks with network operator 2's subscriber database to ensure roaming is allowed before allowing the communication system of vessel 1 to connect to the mesh network or to establish a connection with the terrestrial network of network operator 2. Roaming can be allowed where network operators have service agreements between them to allow subscribers of the other network operator to facilitate communication sessions over the terrestrial networks of the other network operator as well as the communication systems of the maritime mesh network.

The IP connectivity for the communication system of vessel 1 is then eventually routed to the terrestrial network of operator 2. More specifically, the IP connectivity with the Internet Gateway of the terrestrial network of network operator 2 so that a VPN tunnel can be established from the mesh server of vessel 1 to the Internet Gateway of network operator 2. The VPN prevents monitoring and manipulation of data traffic by any bad actors through any of the intermediate connection hops of the mesh network and of any intermediate terrestrial networks.

The communication systems of the vessels in a multi-operator scenario include the same components as described herein above for general secure mesh network communication. In this embodiment, many vessel communication systems with service agreements with different operators can be connected to each other to provide terrestrial network connectivity.

In some embodiments, to ensure that the mesh network operates properly to enable communication between each vessel and the available terrestrial networks, the mesh servers can include processes that prevent various network issues. The mesh servers can avoid a stub connection or circular connection being made in the mesh network. A stub connection is a case where two nearby vessels connect only to one another, for example with FIG. 3 vessel 1 would connect to vessel 2 and vessel 2 would connect to vessel 1. A circular connection may be vessel 1 connecting to vessel 2, vessel 2 connecting to vessel 3, and vessel 3 connecting to vessel 1. Due to the stub or circular connections, the vessels fail to connect with a terrestrial network. Similarly, the mesh server can prevent a mobile network equipment from connecting to a local RAN on the same ship.

The mesh servers can mitigate these and similar problems by forcing local customer premise equipment (CPE) and similar networking components to connect to specific RANs or cells either by using a public land mobile network (PLMN) identifier (PLMN ID) or cell identifier (CELL ID), or by utilizing different frequencies at each RAN and MNE. Mesh servers configuring local RANs and MNEs to utilize different frequencies can also prevent onboard radio frequency interference between a CPE and local RAN. In some embodiments, the mesh server can direct the MNE to utilize absolute radio-frequency channel number (ARFCN) and physical cell identity (PCI) values or similar mechanisms. The mesh server can maintain a database of ARFCN, PCI, and ship identities (e.g., PLMN ID/Cell ID) that can be utilized by a next hop selection process to select a best next hop for a given data connection. The next hop selection process can be implemented at a centralized server (e.g., reached via satellite connection), in a distributed manner at mesh servers (e.g., similar to the implementation of open shortest path first (OSPF) routing algorithm in network devices), or in a similar manner.

Figure 4:
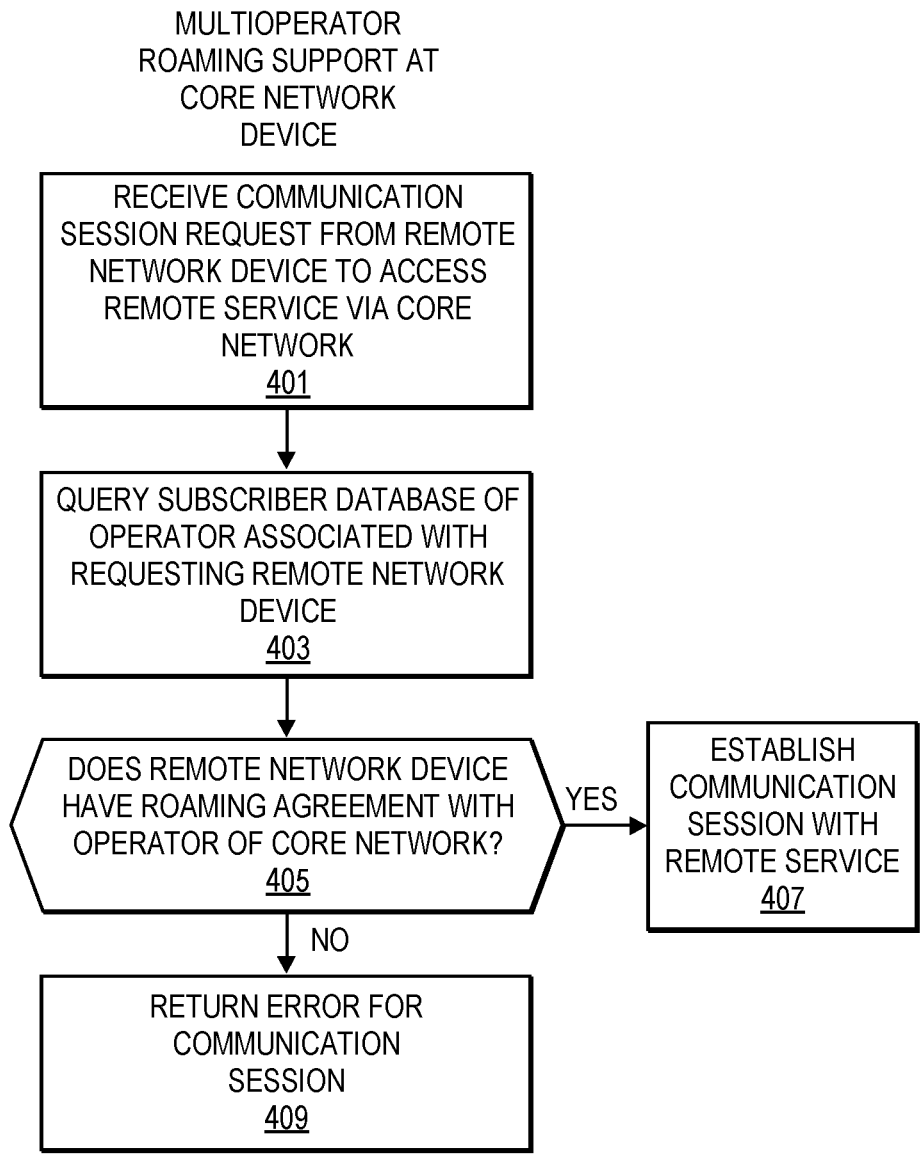
FIG. 4 is a flowchart of one embodiment of a process for supporting roaming in a multi-operator maritime mesh network.

FIG. 4 is a flowchart of one embodiment of a process for supporting roaming in a multi-operator maritime mesh network. The embodiments adapt roaming support (as is possible in terrestrial networks) for use in conjunction with a maritime mesh network that does not have fixed nodes and connections. The process can be implemented by a communication manager or similar component of a mesh server. The process can be initiated by receiving a communication session request from a remote network device to access a remote service via the core network of the communication system (Block 401). In this case, a requesting remote network device can be the mobile network equipment of a communication system of another vessel that is attempting to connect to the mesh network via the communication system of the vessel (e.g., where the mobile network equipment of vessel 1 is attempting to connect via the core network and RAN of vessel 2). The request can be received via a RAN of the communication system.

In response to receiving the communication session request, the communication manager can query a subscriber database of the network operator associated with the remote network device that has generated the request (Block 403). The subscriber database can be accessed or queried via a roaming query process or similar process. The subscriber database can be accessed at a terrestrial network of the network operator via the mesh network or direct communication. In some embodiments, copies of subscriber databases may be accessible within the mesh network. The subscriber database can return information about the subscription associated with the requesting network device including whether the subscription indicates that a roaming agreement exists between the network operators of the requesting and receiving communication systems (Block 405). If a roaming agreement exists, then the communication manager can enable the establishment of the communication session between the remote network device and a requested remote service (Block 407). If a roaming agreement is not found or the subscriber database is unavailable, then the process may return an error indicating a failure to enable the communication session (Block 409). The error can provide any level of detail with relation to the failure.

Thus, the embodiments provide a communication system and methods that improve the operation of maritime mesh networks. The embodiments improve feasibility, improve security, and enable multiple operator support. The embodiments include communications systems with a full segment of terrestrial network components and one or more mobile network equipment(s) installed in each vessel. Security is enhanced using VPNs or similar secured tunneling that is established from each vessel to an Internet Gateway at the respective home network operator for privacy and security. Subscriber Databases are either installed in each vessel, or home network operator subscriber databases are accessed via satellite connection. Roaming-like connectivity is provided to allow a multi-operator environment for maritime mesh network communications.

Figure 5:
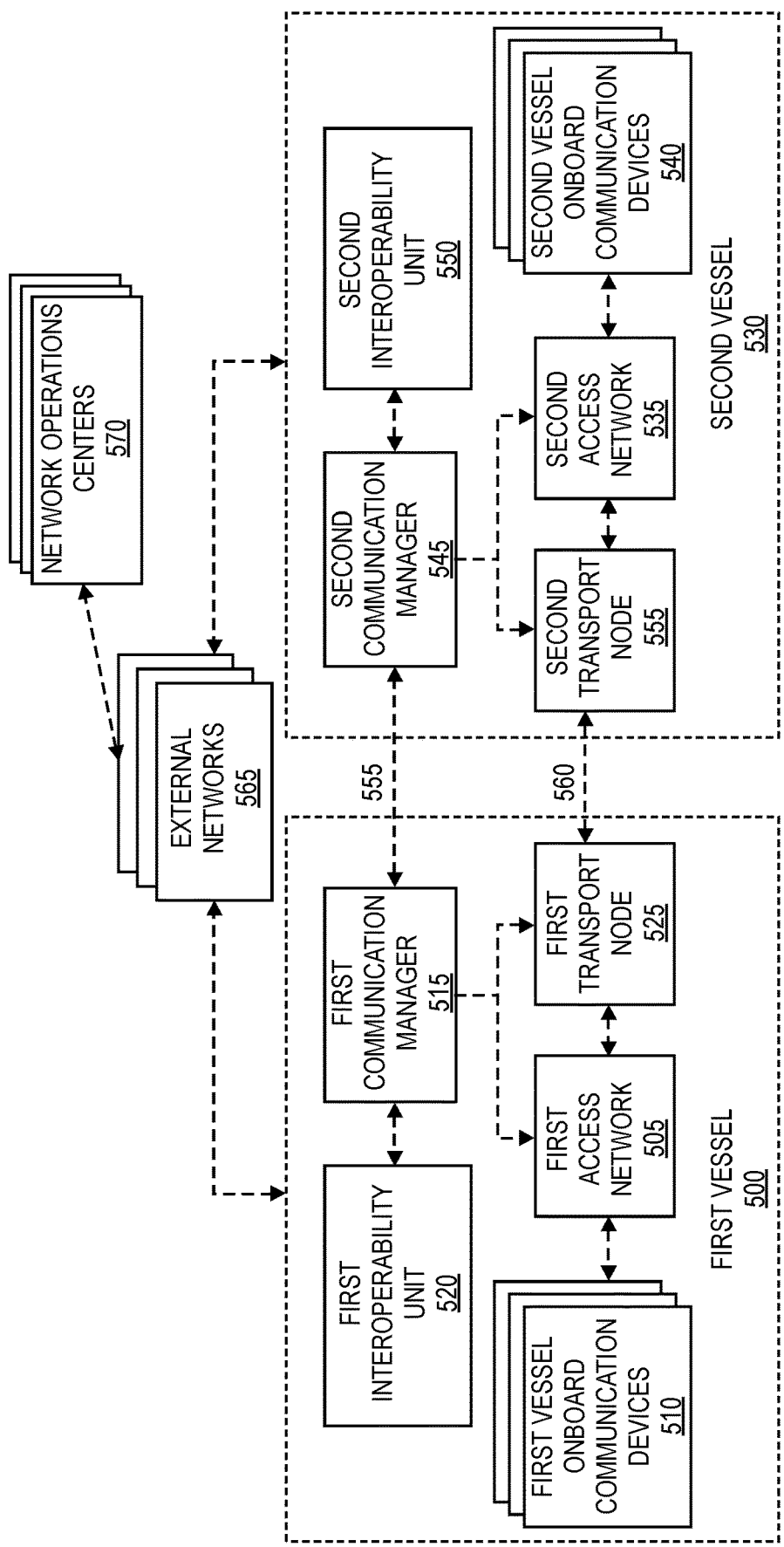
FIG. 5 is a block diagram of an embodiment of a set of communication systems operable within a first maritime vessel and a second maritime vessel.

FIG. 5 is a block diagram of an embodiment of a set of communication systems within a first maritime vessel 500 and a second maritime vessel 530. While the communication systems are illustrated with relation to the first maritime vessel 500 and the second maritime vessel 530, the communication systems as described herein can be deployed to any number of maritime vessels with accompanying modules, subsystems, and similar supporting components. The first maritime vessel 500 includes a communication system with a first access network 505 in communication with first vessel onboard communication devices (generally designated 510). The first access network 505 and first communication manager 515 can be part of a core network described herein above. The first communication manager 515 can also be part of the mesh server described herein above. The first communication manager 515 is in communication with a first interoperability unit 520 and a first transport node 525. The first access network 505 may include a base station, an access point and/or other access network equipment and can accommodate Wi-Fi communications, Ethernet communications, global system for mobile communications, and similar network equipment. The first vessel onboard communication devices 510 may include, without limitation, a transponder, a user equipment, user devices such as a computer, handheld devices, sensors, and may be stand alone or located on or associated with a container on the first maritime vessel 500. If the first vessel onboard communication devices 510 are located on or associated with a container, the first access network 505 is configured to communicate with the first vessel onboard communication devices 510 via a machine-to-machine interface.

The second maritime vessel 530 includes a second access network 535 in communication with second vessel onboard communication devices (generally designated 540). The second maritime vessel 530 also includes a second communication manager 545 in communication with a second interoperability unit 550 and a second transport node 555. The second access network 535 may also include a base station, an access point and/or other access network equipment and can accommodate Wi-Fi communications, Ethernet communications, global system for mobile communications, and similar network equipment. The second vessel onboard communication devices 540 may include, without limitation, a transponder, a user equipment, user devices, such as a computer, handheld devices, sensors, and may be stand alone or located on or associated with a container on the second maritime vessel 530. If the second vessel onboard communication devices 540 are located on or associated with a container, the second access network 535 is configured to communicate with the second vessel onboard communication devices 540 via a machine-to-machine interface.

The first and second communication managers 515, 545 communicate control information over a control plane 575 between the first and second maritime vessels 500, 530. The first and second transport nodes 525, 555 communicate over a transport plane 560 between the first and second maritime vessels 500, 530 and form a portion of a transport network for data transmission between the first and second access networks 505, 535. The first and second transport nodes 525, 555 can encompass RANs and similar communication mechanisms for receiving data and mobile network equipment for transmitting data. The transport network may employ licensed or unlicensed radio spectrum for communication between the first and second access networks 505, 535, and/or other communication systems, subsystems or modules of the first and second maritime vessels 500, 530. The control plane 575 and transport plane 560 may traverse any communication path between the first and second maritime vessels 500, 530 including communication paths that employ licensed or unlicensed spectrum. The first and second communication managers 515, 545, as described herein, are configured to select one of a plurality of external networks (generally designated 565) for communication by at least one of the first and second vessel onboard communication devices 510, 540 via at least one of the first and second access networks 505, 535, transport nodes 525/555, and/or other communication systems, subsystems or modules of the first and second maritime vessels 500, 530. The external networks 565 may be or include, without limitation, a satellite network, a microwave network, a cellular network including both mobile cellular networks across vessels and terrestrial networks, a WiMAX network, and a Wi-Fi network. The external networks can include an ad hoc network configured as a maritime mesh network.

The first and second interoperability units 520, 550 support and convert between multiple communication standards to permit communication for the first and second vessel onboard communication devices 510, 540 onboard the first and second maritime vessels 500, 530, respectively, to the external networks 565. For instance, the first vessel onboard communication devices 510 may communicate with the first access network 505 using a first communication protocol, which is different than a second communication protocol employed by the external networks 565. The first interoperability unit 520, therefore, will perform a protocol conversion from the first communication protocol to the second communication protocol (including a potential encapsulation of the first communication protocol within the second communication protocol) to facilitate communication of the first vessel onboard communication devices 510 over the external networks 565.

The first and second communication managers 515, 545 are configured to provide access to network operations centers (one of which is designated 570) via the first and second access networks 505, 535 for the first and second maritime vessels 500, 530, respectively, and at least one of the external networks 565. The network operations centers 570 maintain a central repository for business rules for communications for a plurality of maritime vessels (including the first and second maritime vessels 500, 530), a central map describing territorial boundaries of sovereign nations and national legal rules associated therewith, the external networks 565 available to the plurality of maritime vessels, and communication capabilities of each of the plurality of maritime vessels. The network operations centers 570 communicate these data including updates to the first and second communication managers 515, 545 and/or other communication systems, subsystems and modules of the first and second maritime vessels 500, 530. For instance, the network operations centers 570 may update the business rules based on roaming agreements or satellite bandwidth pricing agreements. The network operation centers 570 can be maintained and operated by any or more of the network operators connected to the maritime mesh network.

In an embodiment, the first communication manager 515 includes a processor and memory configured to assemble communication parameters including knowledge of a current state of communications onboard the first maritime vessel 500 and the second maritime vessel 530, knowledge of proximity of and access to the external networks 565 to the first maritime vessel 500, and communication rules associated with the external networks 565. The first communication manager 515 is configured to select a first external network from the external networks 565 based on the communication parameters for communication with the first maritime vessel 500 to the second vessel onboard communication devices 540 over a transport network between the first access network 505 and the second access network 535. The first vessel onboard communication devices 510 may also communicate with the first external network and may do so directly by disabling the first access network 505 onboard the first maritime vessel 500. The current state of communications may include a communication demand, a priority of data and bandwidth utilization of the first access network 505 and the second access network 535. Also, ones of the communication parameters can be provided to the first maritime vessel 500 and the second maritime vessel 530 by the network operations centers 570. For instance, the knowledge of proximity of and access to the external networks 565 and the communication rules associated therewith can be provided by the network operations centers 570. The communication rules associated with the external networks 565 may include national legal rules, business rules, and/or quality of service rules. The proximity of the first maritime vessel 500 to the external networks 565 can be assessed using a map and coordinates of the first maritime vessel 500 derived from a global positioning system.

Figure 6:
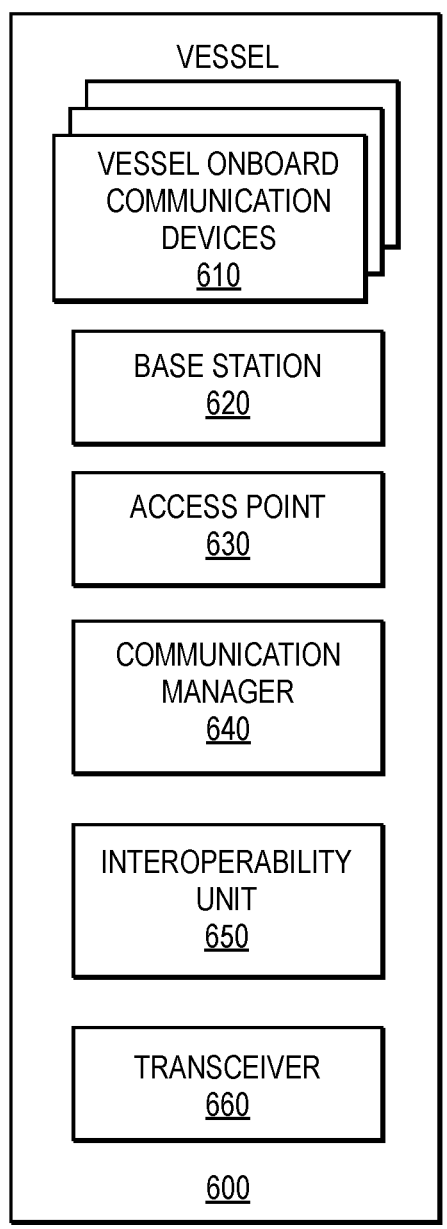
FIG. 6 is a block diagram of an embodiment of a communication system onboard a maritime vessel.

FIG. 6 is a block diagram of an embodiment of a communication system onboard a maritime vessel 600. The communication system includes vessel onboard communication devices (one of which is designated 610) in communication with access networks including a base station 620 and/or an access point 630 to form a type of local area network(s). A communication manager 640 of the communication system is in communication with the access networks and an interoperability unit 650. A transceiver 660 of the communication system facilitates communication from and to the maritime vessel 600 with an external network and/or another maritime vessel. Of course, the aforementioned subsystems and modules, or portions thereof, may be combined into an integrated module, and/or include multiple instances thereof. The communication system, therefore, acts a gateway for communications from the vessel onboard communication devices 610 to the external network and/or another maritime vessel.

With respect to the access network(s), there are many advantages to providing a radio communication system onboard the maritime vessel 600. Such a communication system allows for a vast array of the vessel onboard communication devices 610 to communicate amongst one another and with land-based systems via the external networks in communication with the maritime vessel 600. For example, in the shipping industry it is advantageous to equip containers with the vessel onboard communication devices 610. This allows inventory systems to maintain an accurate inventory of the containers that are onboard the maritime vessel 600 via communication with vessel onboard communication devices 610 using, for instance, short message system ("SMS") messages. Furthermore, some containers require climate control to maintain temperature and humidity therein to protect the climate-sensitive contents within the container. A climate control system associated with the container may include a sensor as part of the vessel onboard communication devices 610 to communicate with inventory systems or diagnostic systems to report climate status or to adjust climate settings via radio communication. In another application, the vessel onboard communication devices 610 may act as a sensor (e.g., engine sensor) to measure parameters associated with the maritime vessel 600 and communicate the information to an onboard vessel control system (e.g., a computer system) and/or a remote control center via the access network(s) and the external networks. Furthermore, the communication system is able to receive configuration settings and software updates for the subsystems and modules onboard the maritime vessel 600 to maintain efficient communications with the vessel onboard communication devices 610.

The communication manager 640 selects the transport routes or channels via the transceiver 660 to the external networks for data transmission for the vessel onboard communication devices 610. The transceiver 660 may implement a satellite backhaul technology to communicate with a corresponding satellite external network and/or a cellular backhaul technology to communicate with a corresponding cellular external network.

The base station 620 can implement many different communication protocols to create a local area network with the vessel onboard communication devices 610. The communication protocols include, without limitation, a global system for mobile communications ("GSM") protocol, a code division multiple access 2000 ("CDMA2000") protocol, a general packet radio service ("GPRS") protocol, and/or an enhanced data rate for global system ("EDGE") protocol. The access point 630 can implement many different communication protocols (e.g., an IEEE 802.11 wireless local area network standard) to create a local area network with the vessel onboard communication devices 610. Of course, other communication protocols and standards such as personal area networks (i.e., IEEE 802.15) and wireless wide area networks (i.e., IEEE 802.16 for WiMAX) may also be employed to advantage. The interoperability unit 650 supports and converts between multiple communication protocols and standards to permit communication for the vessel onboard communication devices 610 to the external networks and/or another maritime vessel.

Figure 7:
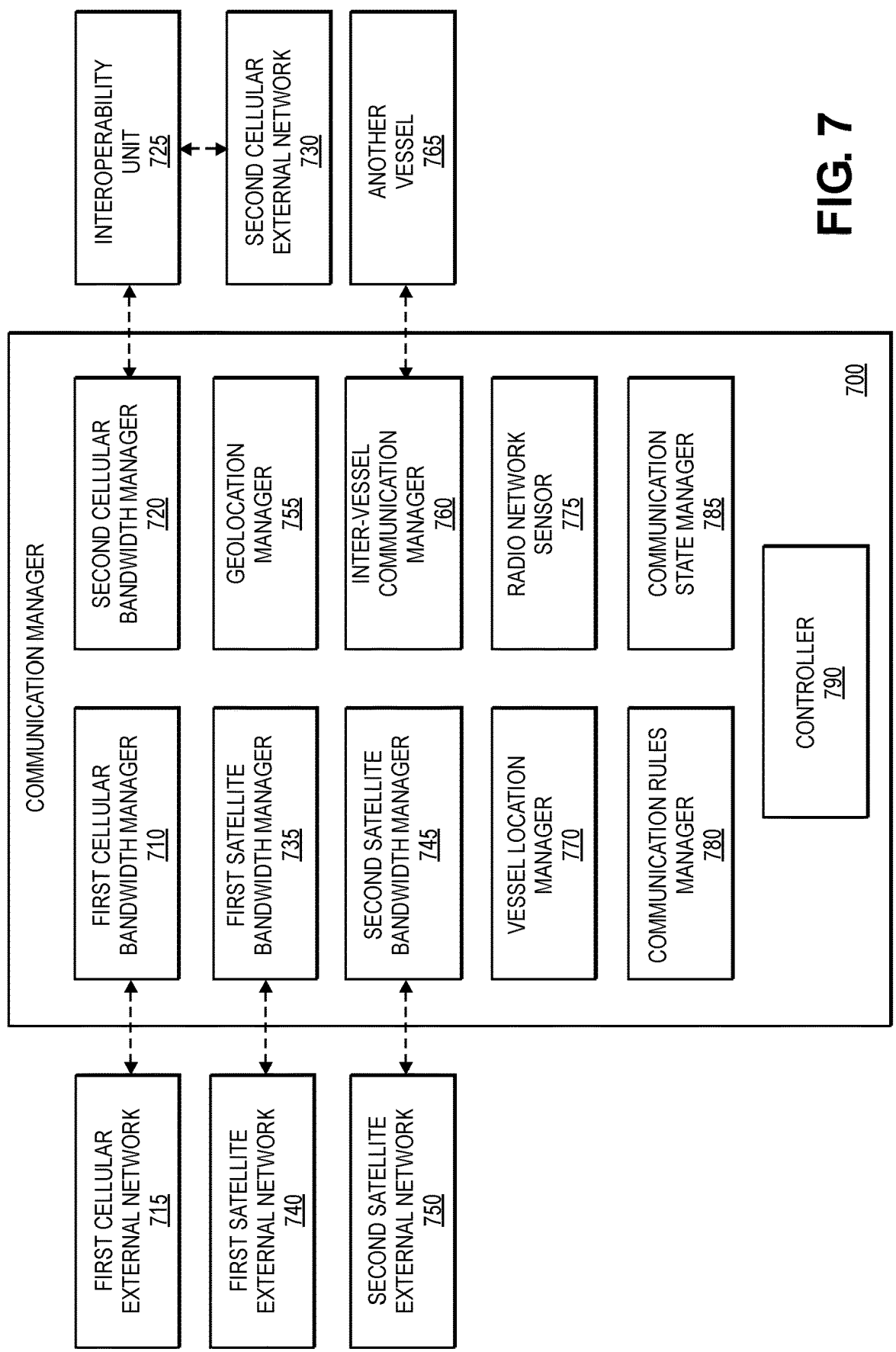
FIG. 7 is a block diagram of an embodiment of a communication manager associated with a maritime vessel.

FIG. 7 is a block diagram of an embodiment of a communication manager 700 associated with a maritime vessel. The communication manager 700 is configured to manage communications for vessel onboard communication devices to external networks and/or another maritime vessel. The communication manager 700 includes a first cellular bandwidth manager 710 that manages communications with a first cellular external network 715. The communication manager 700 includes a second cellular bandwidth manager 720 that manages communications with a second cellular external network 730 via an interoperability unit 725. The interoperability unit 725 supports and converts between multiple communication protocols and standards to permit communication for the vessel onboard communication devices to the second cellular external network 730. If the vessel onboard communication devices are Wi-Fi compatible, the interoperability unit 725 will convert or encapsulate the Wi-Fi based information to the cellular protocol of the second cellular external network 730 for communication therewith. In a sense, the interoperability unit 725 can create a cellular protocol (e.g., a 3GPP LTE cellular protocol) tunnel for the Wi-Fi based information through the second cellular external network 730. Of course, the interoperability unit 725 can also be employed with the first cellular bandwidth manager 710 to provide protocol version with respect to the first cellular external network 715, if necessary.

Regarding communication system control, the first and second cellular bandwidth managers 710, 720 in cooperation with a controller 790 can control the communication systems (e.g., control the directional power of sector(s) of an antenna(s)) of the maritime vessel to facilitate communication with the first and second cellular external networks 715, 730, respectively. Thus, the communication manager 700 supports multiple cellular external networks using different communication protocols and standards via the first and second cellular bandwidth managers 710, 720 and the interoperability unit 725.

The communication manager 700 includes a first satellite bandwidth manager 735 that manages communications with a first satellite external network 740. The communication manager 700 includes a second satellite bandwidth manager 745 that manages communications with a second satellite external network 750. The first and second satellite bandwidth managers 735, 745 in cooperation with the controller 790 perform an analogous function to the first and second cellular bandwidth managers 710, 720 with respect to the first and second satellite external networks 740, 750, respectively. The first and second satellite bandwidth managers 735, 745 may support different satellite technologies. For instance, L-band satellite communications tend to have lower data rates (or more expensive charges for the same amount of data), but higher availability. Higher frequency satellite networks such as Ku-band satellite networks may have lower charges per data unit, but more issues with availability due to coverage or rain fade events. The communication manager 700, therefore, provides flexibility to communicate with different satellite networks. The interoperability unit 725 may also be used in conjunction with the first and second satellite bandwidth managers 735, 745 to convert between different protocols employed by the first and second satellite external networks 740, 750 and the vessel onboard communication devices, if necessary.

A geolocation manager 755 in the communication manager 700 includes a map function that shows where different kinds of communications are allowed and possible. For instance, while an onboard cellular access network can be used in international waters, the onboard cellular access network may not be used within a national legal boundary of a shore line due to potential interference with terrestrial networks. The geolocation manager 755 taking into account a position of the maritime vessel can provide information to the controller 790 of the communication manager 700 regarding proper forms of communication employable by the access networks onboard the maritime vessel. The geolocation manager 755, therefore, includes jurisdictional information regarding national legal boundaries as well as boundaries of licensed areas.

The communication manager 700 includes an inter-vessel communication manager 760 that manages communications with another maritime vessel 765 via a corresponding inter-vessel communication manager thereon. Typically, the inter-vessel communication manager 760 in cooperation with the controller 790 manages the communication between maritime vessels using unlicensed spectrum such as unlicensed LTE, WiMAX, microwave, etc. bands, which is unaffected by the business rules associated with an external network within a national legal boundary of a country.

A vessel location manager 770 of the communication manager 700 keeps track of the maritime vessel and neighboring maritime vessels (e.g., the another maritime vessel 765) including information about which communications facilities are available on the neighboring maritime vessels. This is dynamic information that is periodically updated via, for instance, satellite broadcast with the vessel location manager 770. A radio network sensor (or radio sniffer) 775 of the communication manager 700 searches for and keeps track of available external networks for the benefit of communication with the vessel onboard communication devices. This information can be used to augment the geolocation manager information by giving an indication of what networks are actually physically present at a maritime location.

The communication manager 700 includes a communication rules manager 780 that tracks communication rules associated with a plurality of external networks. The communication rules manager 780 includes rules based on national legal boundaries associated with sovereignty and spectrum licensing. The communication rules manager 780 also includes rules based on the amount and priority of data to be sent. These rules include costs associated with the available external networks such as communication networks with available roaming agreements as well as fixed-cost networks such as private satellite networks. In short, the communication rules may include national legal rules, business rules, and quality of service rules. The communication manager 700 also includes a communication state manager 785 that maintains knowledge of a current state of communications onboard the maritime vessel and neighboring maritime vessels (e.g., the another maritime vessel 765).

The controller 790 provides overall management of the communication manager 700 and assembles communication parameters from the subsystems and modules thereof. The communication parameters may include knowledge of the current state of communications onboard the maritime vessel and the neighboring maritime vessels, knowledge of proximity of and access to a plurality of external networks to the maritime vessel, and communication rules associated with the plurality of external networks. The controller 790 may select an external network (e.g., the first cellular external network 715) from the plurality of external networks based on the communication parameters for communication from the maritime vessel to the another vessel onboard communication devices (e.g., on another maritime vessel 765) over a transport network between access networks on the maritime vessels. The controller 790 can take into account which external network should be used from a business rules perspective including the cost of the bandwidth using that external network, the priority of data to be sent and jurisdictional requirements. The VPN and roaming processes described herein can be implemented by the controller 790 or similar component of the communication manager 700.

Figure 8:
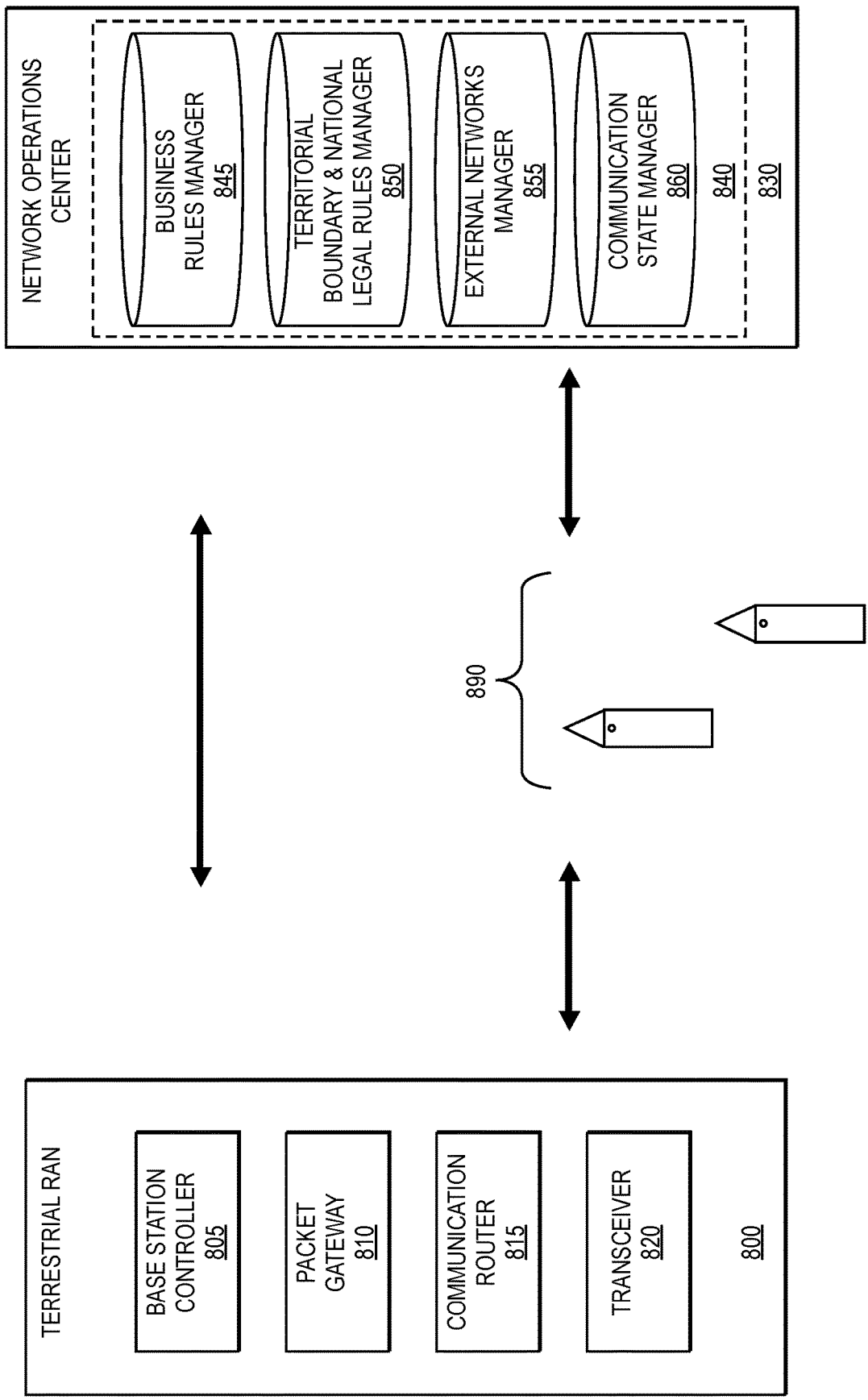
FIG. 8 is a block diagram of an embodiment of an external network in communication with a network operations center and a plurality of maritime vessels.

FIG. 8 is a block diagram of an embodiment of an external network 800 in communication with a network operations center 830 and a plurality of maritime vessels 890. The external network 800 in the illustrated embodiment is a terrestrial radio access network ("RAN"). The terrestrial radio access network 800 includes, without limitation, a base station controller 805, a packet gateway 810, a communication router 815, and a transceiver 820. Of course, the terrestrial radio access network 800 may include many instances of the above-referenced subsystems or modules, and other subsystems or modules as well. The transceiver 820 is coupled with the communication router 815. As the transceiver 820 receives packets from the other external networks, the plurality of maritime vessels 890, etc., the packets are forwarded to the communication router 815. The communication router 815 routes each packet to the packet gateway 810. The packet gateway 810 further couples an access network(s) and/or vessel onboard communication devices thereon with the base station controller 805. The base station controller 805 may assist with configuring the access networks(s) onboard the plurality of maritime vessels 890. The base station controller 805 provides intelligence for configuring/controlling base stations associated with the terrestrial radio access network 800.

The network operations center 830 includes a central repository 840 for, without limitation, a business rules manager 845, a territorial boundary and national legal rules manager 850, an external networks manager 855, and a communication state manager 860. The network operations center 830 communicates with the plurality of maritime vessels 890. The business rules manager 845 provides a central repository 840 for, receives updates for, and provides business rules for communications for the plurality of maritime vessels 890. The territorial boundary and national legal rules manager 850 provides a central repository 840 for, receives updates for, and provides a central map describing territorial boundaries of sovereign nations and national legal rules associated therewith. The external networks manager 855 provides a central repository 840 for, receives updates for, and provides a plurality of external networks available to the plurality of maritime vessels 890. The communication state manager 860 provides a central repository 840 for, receives updates for, and provides communication capabilities of each of the plurality of maritime vessels 890.

Figure 9:
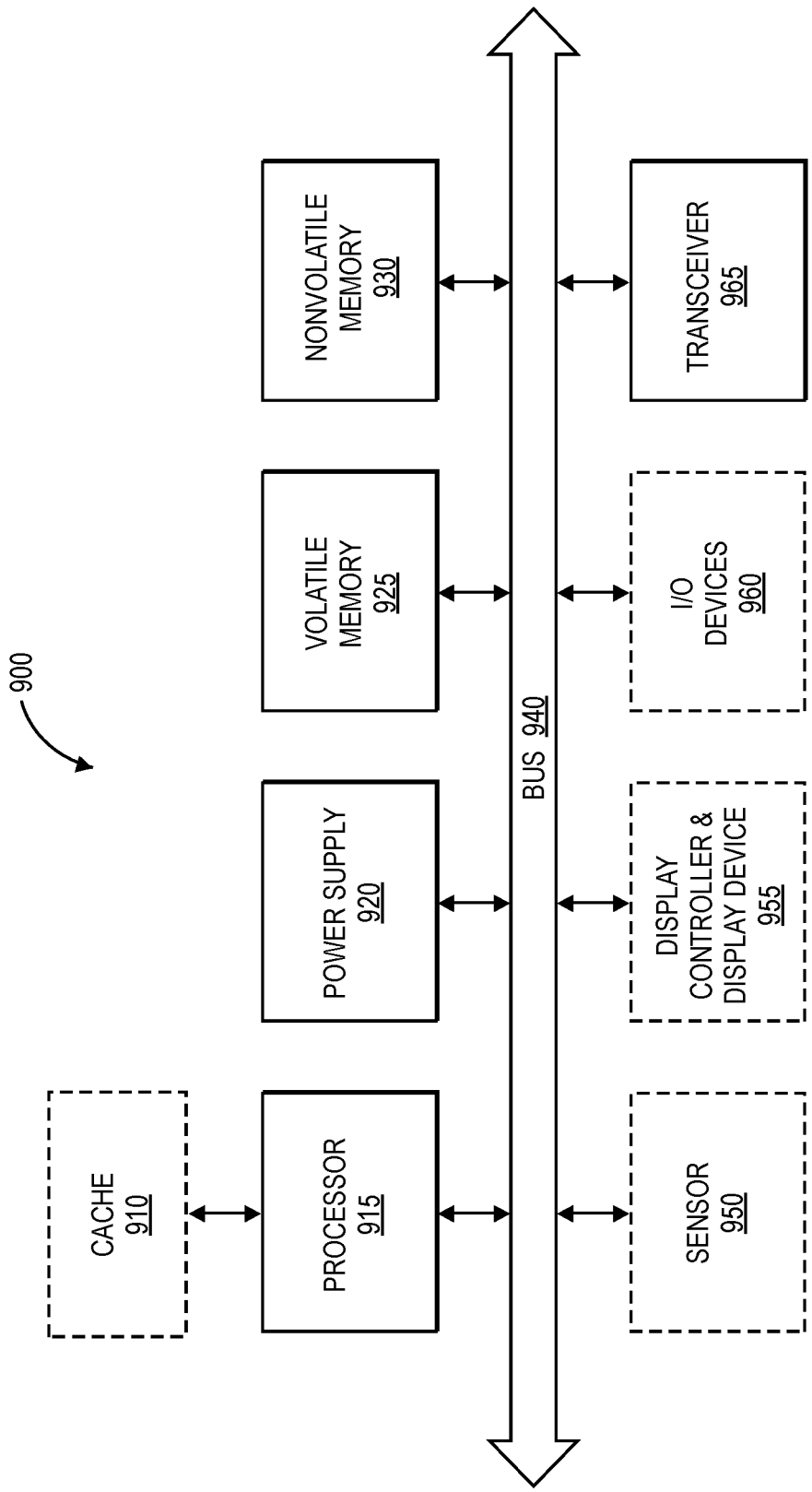
FIG. 9 is a block diagram of an embodiment of a computer system operable with the systems, subsystems and modules.

FIG. 9 is a block diagram of an embodiment of a computer system 900 operable with the systems, subsystems and modules described herein. For example, the computer system 900, or portions thereof, can be employed with a communication manager, a network operations center, vessel onboard communication devices, and similar devices. Those skilled in the art should recognize that the computer system 900 may have more or less components including many instances of the subsystems or modules set forth below.

The computer system 900 includes a bus 940, which is coupled to a processor 915, a power supply 920, memory that can be implemented as volatile memory 925 (e.g., double data rate random access memory ("DDR-RAM"), single data rate ("SDR") RAM), and nonvolatile memory 930 (e.g., a hard drive, flash memory, or a phase-change memory ("PCM")). The processor 915 may be coupled to a cache 910. The processor 915 may retrieve instruction(s)

from the volatile memory 925 and/or the nonvolatile memory 930, and execute the instruction(s) to perform operations described herein. The bus 940 couples the above elements together and further couples a sensor 950, a display controller and display device 955, one or more input/output devices 960 (e.g., a network interface card, a cursor control such as a mouse, trackball, touchscreen, touchpad, and a keyboard), and a wireless transceiver 965 (e.g., Bluetooth, Wi-Fi, infrared, cellular, satellite, and similar technologies).

Figure 10:
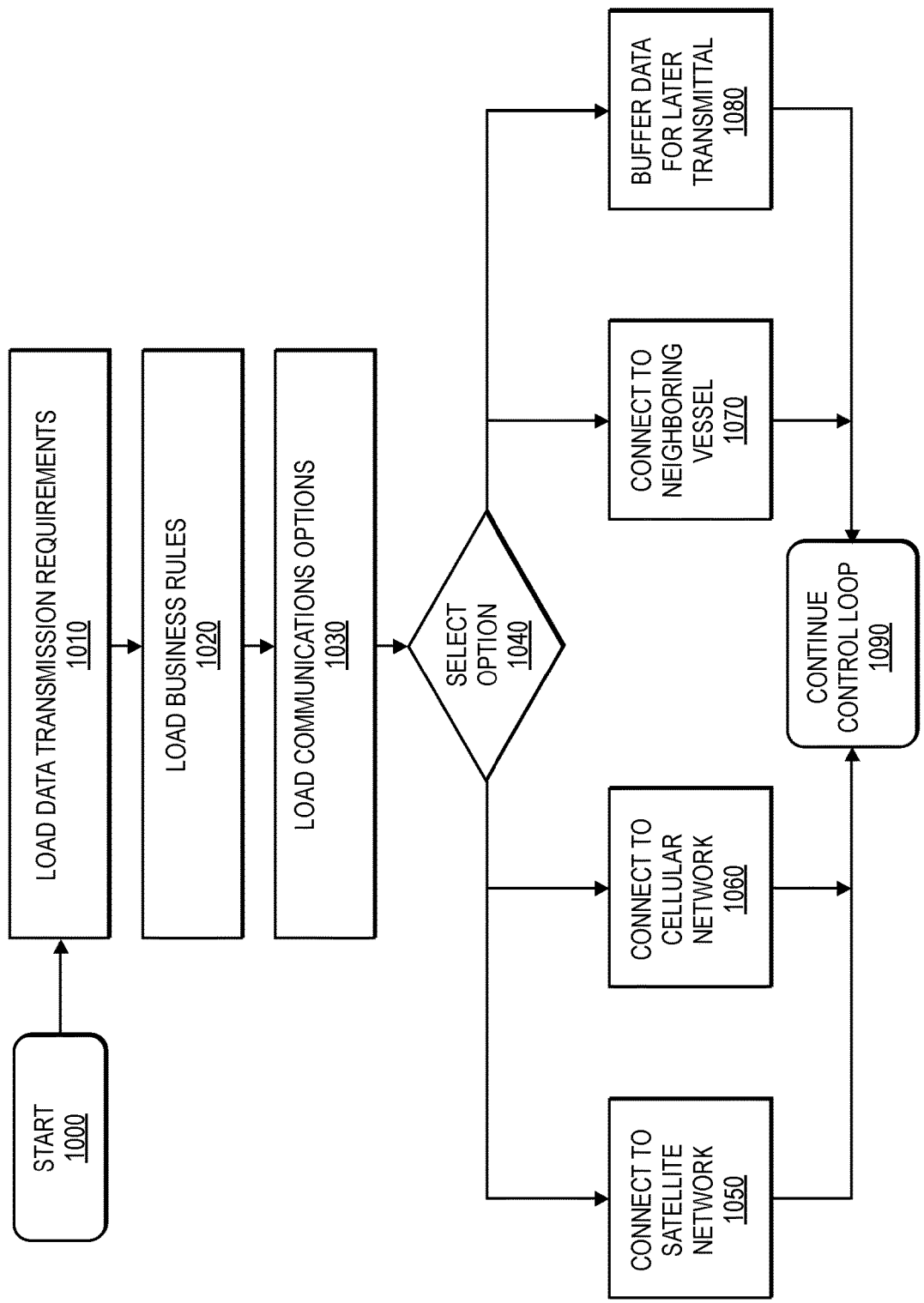
FIG. 10 is a block diagram of an embodiment of a method for selecting a communication option for a maritime vessel.

FIG. 10 is a block diagram of an embodiment of a method for selecting a communication option for a maritime vessel. The method begins at Block 1000 and transitions to Block 1010 wherein data transmission requirements are loaded into a communication system. The communication system regularly monitors data transmission needs as well as the priority of the data, among other things. The communication system can also use quality of service queue depths that will inform the communication system not only about the instantaneous demand for communications, but also allow for predictions of future communications demand. Of course, the data transmission requirements are dynamic communication parameters.

In Block 1020, business rules are loaded. While the business rules tend to be more static, the communication system should be updated to take into account, without limitation, new roaming agreements and new satellite paths. In its simplest form, this communication parameter can incorporate a cost per communication path for consideration by the communication system. In Block 1030, communication options are loaded. This process can make use of stored map data and the maritime vessel's location to determine the available communication options such as, for instance, a satellite or cellular network. As noted previously, the communication system can connect to access networks of neighboring maritime vessels as well.

In Block 1040, the communication system selects an option for communicating with the maritime vessel. The selected option should take into account a plurality of communication parameters. For instance, the selected option decision can be made by taking the loaded business rules and applying the same to the available communications options based on the transmission requirements. This will lead to a number of possible communication options as well as an option to not transmit anything at all, but to buffer the data.

The maritime vessel may connect to a satellite network to send data via the vessel's satcom equipment in accordance with Block 1050. The maritime vessel may turn off an access network therein and connect to a cellular network in accordance with Block 1060. A further result includes connecting to a neighboring maritime vessel for off-vessel communication in accordance with Block 1070. A further result is to buffer the data for later transmission in accordance with Block 1080. The control loop repeats the overall method in accordance with Block 1090. The method provides cost and efficiency improvements of a maritime vessel's communication needs on a fleet-wide basis.

FIG. 11A illustrates connectivity between network devices (NDs) within an exemplary network, as well as three exemplary implementations of the NDs, according to some embodiments of the invention. FIG. 11A shows NDs 1100A-H, and their connectivity by way of lines between 1100A-1100B, 1100B-1100C, 1100C-1100D, 1100D-1100E, 1100E-1100F, 1100F-1100G, and 1100A-1100G, as well as between 1100H and each of 1100A, 1100C, 1100D, and 1100G. These NDs are physical devices, and the connectivity between these NDs can be wireless or wired (often referred to as a link). An additional line extending from NDs 1100A, 1100E, and 1100F illustrates that these NDs act as ingress and egress points for the network (and thus, these NDs are sometimes referred to as edge NDs; while the other NDs may be called core NDs).

Two of the exemplary ND implementations in FIG. 11A are: 1) a special-purpose network device 1102 that uses custom application-specific integrated-circuits (ASICs) and a special-purpose operating system (OS); and 2) a general purpose network device 1104 that uses common off-the-shelf (COTS) processors and a standard OS.

The special-purpose network device 1102 includes networking hardware 1110 comprising a set of one or more processor(s) 1112, forwarding resource(s) 1114 (which typically include one or more ASICs and/or network processors), and physical network interfaces (NIs) 1116 (through which network connections are made, such as those shown by the connectivity between NDs 1100A-H), as well as non-transitory machine readable storage media 1118 having stored therein networking software 1120. During operation, the networking software 1120 may be executed by the networking hardware 1110 to instantiate a set of one or more networking software instance(s) 1122. Each of the networking software instance(s) 1122, and that part of the networking hardware 1110 that executes that network software instance (be it hardware dedicated to that networking software instance and/or time slices of hardware temporally shared by that networking software instance with others of the networking software instance(s) 1122), form a separate virtual network element 1130A-R. Each of the virtual network element(s) (VNEs) 1130A-R includes a control communication and configuration module 1132A-R (sometimes referred to as a local control module or control communication module) and forwarding table(s) 1134A-R, such that a given virtual network element (e.g., 1130A) includes the control communication and configuration module (e.g., 1132A), a set of one or more forwarding table(s) (e.g., 1134A), and that portion of the networking hardware 1110 that executes the virtual network element (e.g., 1130A). The networking software 1120 can include any of the components of the communication systems described herein including the communication manager 1121, which implements the functions of the embodiments as described herein above.

The special-purpose network device 1102 is often physically and/or logically considered to include: 1) a ND control plane 1124 (sometimes referred to as a control plane) comprising the processor(s) 1112 that execute the control communication and configuration module(s) 1132A-R; and 2) a ND forwarding plane 1126 (sometimes referred to as a forwarding plane, a data plane, or a media plane) comprising the forwarding resource(s) 1114 that utilize the forwarding table(s) 1134A-R and the physical NIs 1116. By way of example, where the ND is a router (or is implementing routing functionality), the ND control plane 1124 (the processor(s) 1112 executing the control communication and configuration module(s) 1132A-R) is typically responsible for participating in controlling how data (e.g., packets) is to be routed (e.g., the next hop for the data and the outgoing physical NI for that data) and storing that routing information in the forwarding table(s) 1134A-R, and the ND forwarding plane 1126 is responsible for receiving that data on the physical NIs 1116 and forwarding that data out the appropriate ones of the physical NIs 1116 based on the forwarding table(s) 1134A-R.

FIG. 11B illustrates an exemplary way to implement the special-purpose network device 1102 according to some embodiments of the invention. FIG. 11B shows a special-purpose network device including cards 1138 (typically hot pluggable). While in some embodiments the cards 1138 are of two types (one or more that operate as the ND forwarding plane 1126 (sometimes called line cards), and one or more that operate to implement the ND control plane 1124 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1136 (e.g., a first full mesh coupling the line cards and a second full mesh coupling all of the cards).

Returning to FIG. 11A, the general purpose network device 1104 includes hardware 1140 comprising a set of one or more processor(s) 1142 (which are often COTS processors) and physical NIs 1146, as well as non-transitory machine readable storage media 1148 having stored therein software 1150. During operation, the processor(s) 1142 execute the software 1150 to instantiate one or more sets of one or more applications 1164A-R. While one embodiment does not implement virtualization, alternative embodiments may use different forms of virtualization. For example, in one such alternative embodiment the virtualization layer 1154 represents the kernel of an operating system (or a shim executing on a base operating system) that allows for the creation of multiple instances 1162A-R called software containers that may each be used to execute one (or more) of the sets of applications 1164A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1154 represents a hypervisor (sometimes referred to as a virtual machine monitor (VMM)) or a hypervisor executing on top of a host operating system, and each of the sets of applications 1164A-R is run on top of a guest operating system within an instance 1162A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1140, directly on a hypervisor (in which case the unikernel is sometimes described as running within a LibOS virtual machine), or in a software container, embodiments can be implemented fully with unikernels running directly on a hypervisor represented by virtualization layer 1154, unikernels running within software containers represented by instances 1162A-R, or as a combination of unikernels and the above-described techniques (e.g., unikernels and virtual machines both run directly on a hypervisor, unikernels and sets of applications that are run in different software containers). The software 1150 can include any of the components of the communication systems described herein including the communication manager 1121. The communication manager 1121 can implement the functions of the embodiments as described herein above.

The instantiation of the one or more sets of one or more applications 1164A-R, as well as virtualization if implemented, are collectively referred to as software instance(s) 1152. Each set of applications 1164A-R, corresponding virtualization construct (e.g., instance 1162A-R) if implemented, and that part of the hardware 1140 that executes them (be it hardware dedicated to that execution and/or time slices of hardware temporally shared), forms a separate virtual network element(s) 1160A-R.

The virtual network element(s) 1160A-R perform similar functionality to the virtual network element(s) 1130A-R—e.g., similar to the control communication and configuration module(s) 1132A and forwarding table(s) 1134A (this virtualization of the hardware 1140 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1162A-R corresponding to one VNE 1160A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1162A-R to VNEs also apply to embodiments where such a finer level of granularity and/or unikernels are used.

In certain embodiments, the virtualization layer 1154 includes a virtual switch that provides similar forwarding services as a physical Ethernet switch. Specifically, this virtual switch forwards traffic between instances 1162A-R and the physical NI(s) 1146, as well as optionally between the instances 1162A-R; in addition, this virtual switch may enforce network isolation between the VNEs 1160A-R that by policy are not permitted to communicate with each other (e.g., by honoring virtual local area networks (VLANs)).

The third exemplary ND implementation in FIG. 11A is a hybrid network device 1106, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1102) could provide for para-virtualization to the networking hardware present in the hybrid network device 1106.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1130A-R, VNEs 1160A-R, and those in the hybrid network device 1106) receives data on the physical NIs (e.g., 1116, 1146) and forwards that data out the appropriate ones of the physical NIs (e.g., 1116, 1146). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 11C:
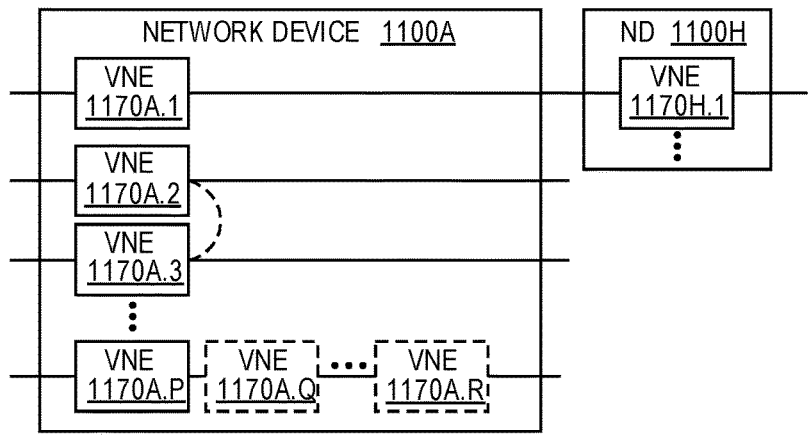
FIG. 11C illustrates various exemplary ways in which virtual network elements (VNEs) may be coupled according to some embodiments of the invention.

FIG. 11C illustrates various exemplary ways in which VNEs may be coupled according to some embodiments of the invention. FIG. 11C shows VNEs 1170A.1-1170A.P (and optionally VNEs 1170A.Q-1170A.R) implemented in ND 1100A and VNE 1170H.1 in ND 1100H. In FIG. 11C, VNEs 1170A.1-P are separate from each other in the sense that they can receive packets from outside ND 1100A and forward packets outside of ND 1100A; VNE 1170A.1 is coupled with VNE 1170H.1, and thus they communicate packets between their respective NDs; VNE 1170A.2-1170A.3 may optionally forward packets between themselves without forwarding them outside of the ND 1100A; and VNE 1170A.P may optionally be the first in a chain of VNEs that includes VNE 1170A.Q followed by VNE 1170A.R (this is sometimes referred to as dynamic service chaining, where each of the VNEs in the series of VNEs provides a different service—e.g., one or more layer 4-7 network services). While FIG. 11C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 11A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 11A may also host one or more such servers (e.g., in the case of the general purpose network device 1104, one or more of the software instances 1162A-R may operate as servers; the same would be true for the hybrid network device 1106; in the case of the special-purpose network device 1102, one or more such servers could also be run on a virtualization layer executed by the processor(s) 1112); in which case the servers are said to be co-located with the VNEs of that ND.

A virtual network is a logical abstraction of a physical network (such as that in FIG. 11A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 11D:
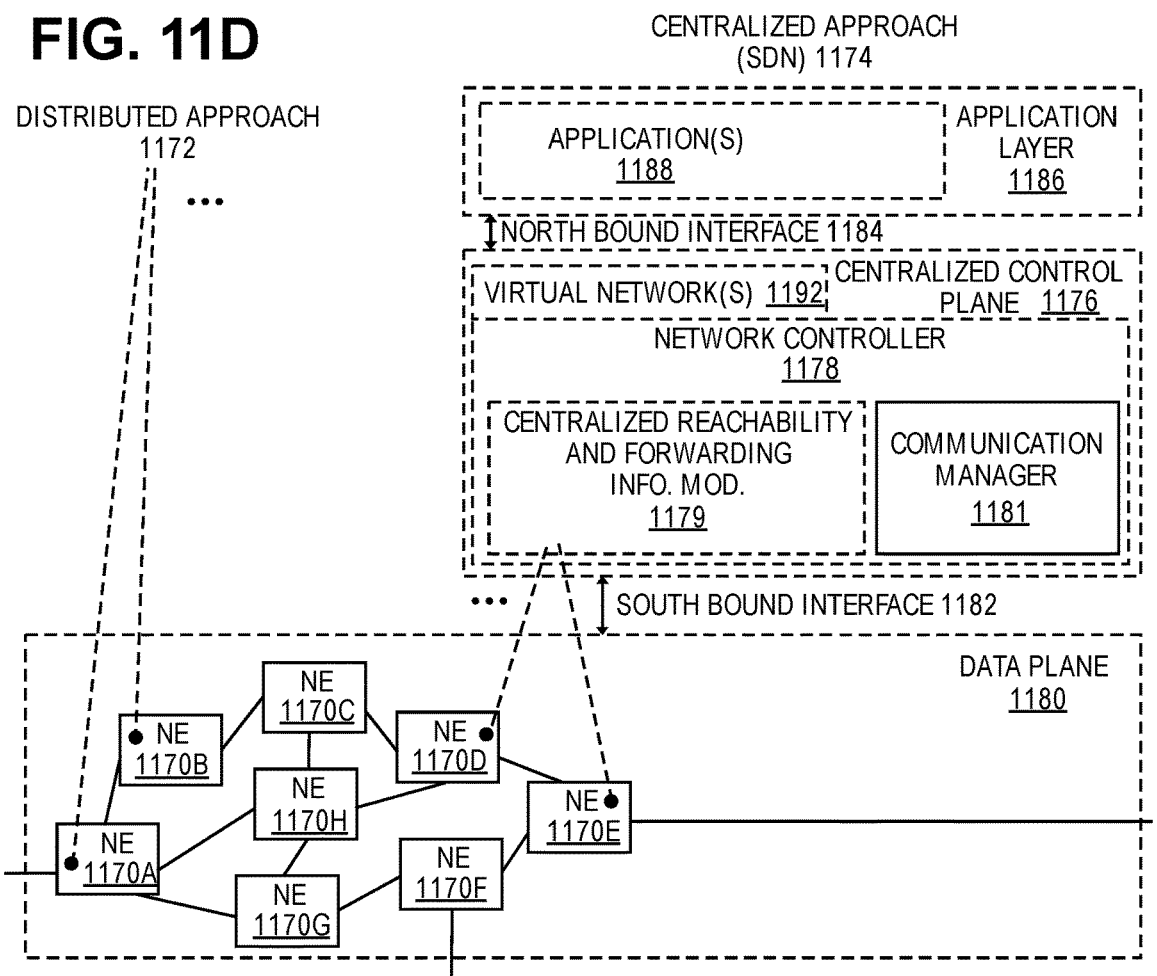
FIG. 11D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 11D illustrates a network with a single network element on each of the NDs of FIG. 11A, and within this straight forward approach contrasts a traditional distributed approach (commonly used by traditional routers) with a centralized approach for maintaining reachability and forwarding information (also called network control), according to some embodiments of the invention. Specifically, FIG.

11D illustrates network elements (NEs) 1170A-H with the same connectivity as the NDs 1100A-H of FIG. 11A.

FIG. 11D illustrates that the distributed approach 1172 distributes responsibility for generating the reachability and forwarding information across the NEs 1170A-H; in other words, the process of neighbor discovery and topology discovery is distributed.

For example, where the special-purpose network device 1102 is used, the control communication and configuration module(s) 1132A-R of the ND control plane 1124 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1170A-H (e.g., the processor(s) 1112 executing the control communication and configuration module(s) 1132A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1124. The ND control plane 1124 programs the ND forwarding plane 1126 with information (e.g., adjacency and route information) based on the routing structure(s). For example, the ND control plane 1124 programs the adjacency and route information into one or more forwarding table(s) 1134A-R (e.g., Forwarding Information Base (FIB), Label Forwarding Information Base (LFIB), and one or more adjacency structures) on the ND forwarding plane 1126. For layer 2 forwarding, the ND can store one or more bridging tables that are used to forward data based on the layer 2 information in that data. While the above example uses the special-purpose network device 1102, the same distributed approach 1172 can be implemented on the general purpose network device 1104 and the hybrid network device 1106.

FIG. 11D illustrates that a centralized approach 1174 (also known as software defined networking (SDN)) that decouples the system that makes decisions about where traffic is sent from the underlying systems that forwards traffic to the selected destination. The illustrated centralized approach 1174 has the responsibility for the generation of reachability and forwarding information in a centralized control plane 1176 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1176 has a south bound interface 1182 with a data plane 1180 (sometime referred to the infrastructure layer, network forwarding plane, or forwarding plane (which should not be confused with a ND forwarding plane)) that includes the NEs 1170A-H (sometimes referred to as switches, forwarding elements, data plane elements, or nodes). The centralized control plane 1176 includes a network controller 1178, which includes a centralized reachability and forwarding information module 1179 that determines the reachability within the network and distributes the forwarding information to the NEs 1170A-H of the data plane 1180 over the south bound interface 1182 (which may use the OpenFlow protocol). Thus, the network intelligence is centralized in the centralized control plane 1176 executing on electronic devices that are typically separate from the NDs. The network controller 1178 can include any of the components of the communication systems described herein including the communication manager 1181. The communication manager 1181 can implement the functions of the embodiments as described herein above.

For example, where the special-purpose network device 1102 is used in the data plane 1180, each of the control communication and configuration module(s) 1132A-R of the ND control plane 1124 typically include a control agent that provides the VNE side of the south bound interface 1182. In this case, the ND control plane 1124 (the processor(s) 1112 executing the control communication and configuration module(s) 1132A-R) performs its responsibility for participating in controlling how data (e.g., packets) is to be routed (e.g., the next hop for the data and the outgoing physical NI for that data) through the control agent communicating with the centralized control plane 1176 to receive the forwarding information (and in some cases, the reachability information) from the centralized reachability and forwarding information module 1179 (it should be understood that in some embodiments of the invention, the control communication and configuration module(s) 1132A-R, in addition to communicating with the centralized control plane 1176, may also play some role in determining reachability and/or calculating forwarding information—albeit less so than in the case of a distributed approach; such embodiments are generally considered to fall under the centralized approach 1174, but may also be considered a hybrid approach).

While the above example uses the special-purpose network device 1102, the same centralized approach 1174 can be implemented with the general purpose network device 1104 (e.g., each of the VNE 1160A-R performs its responsibility for controlling how data (e.g., packets) is to be routed (e.g., the next hop for the data and the outgoing physical NI for that data) by communicating with the centralized control plane 1176 to receive the forwarding information (and in some cases, the reachability information) from the centralized reachability and forwarding information module 1179; it should be understood that in some embodiments of the invention, the VNEs 1160A-R, in addition to communicating with the centralized control plane 1176, may also play some role in determining reachability and/or calculating forwarding information—albeit less so than in the case of a distributed approach) and the hybrid network device 1106. In fact, the use of SDN techniques can enhance the NFV techniques typically used in the general purpose network device 1104 or hybrid network device 1106 implementations as NFV is able to support SDN by providing an infrastructure upon which the SDN software can be run, and NFV and SDN both aim to make use of commodity server hardware and physical switches.

FIG. 11D also shows that the centralized control plane 1176 has a north bound interface 1184 to an application layer 1186, in which resides application(s) 1188. The centralized control plane 1176 has the ability to form virtual networks 1192 (sometimes referred to as a logical forwarding plane, network services, or overlay networks (with the NEs 1170A-H of the data plane 1180 being the underlay network)) for the application(s) 1188. Thus, the centralized control plane 1176 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 11D shows the distributed approach 1172 separate from the centralized approach 1174, the effort of network control may be distributed differently or the two combined in certain embodiments of the invention. For example: 1) embodiments may generally use the centralized approach (SDN) 1174, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1174, but may also be considered a hybrid approach.

While FIG. 11D illustrates the simple case where each of the NDs 1100A-H implements a single NE 1170A-H, it should be understood that the network control approaches described with reference to FIG. 11D also work for networks where one or more of the NDs 1100A-H implement multiple VNEs (e.g., VNEs 1130A-R, VNEs 1160A-R, those in the hybrid network device 1106). Alternatively or in addition, the network controller 1178 may also emulate the implementation of multiple VNEs in a single ND. Specifically, instead of (or in addition to) implementing multiple VNEs in a single ND, the network controller 1178 may present the implementation of a VNE/NE in a single ND as multiple VNEs in the virtual networks 1192 (all in the same one of the virtual network(s) 1192, each in different ones of the virtual network(s) 1192, or some combination). For example, the network controller 1178 may cause an ND to implement a single VNE (a NE) in the underlay network, and then logically divide up the resources of that NE within the centralized control plane 1176 to present different VNEs in the virtual network(s) 1192 (where these different VNEs in the overlay networks are sharing the resources of the single VNE/NE implementation on the ND in the underlay network).

Figure 11E:
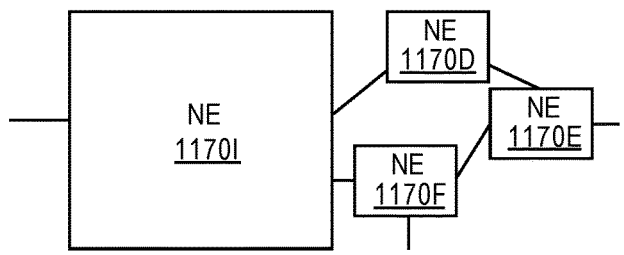
FIG. 11E illustrates the simple case of where each of the NDs implements a single NE, but a centralized control plane has abstracted multiple of the NEs in different NDs into (to represent) a single NE in one of the virtual network(s), according to some embodiments of the invention.
Figure 11F:
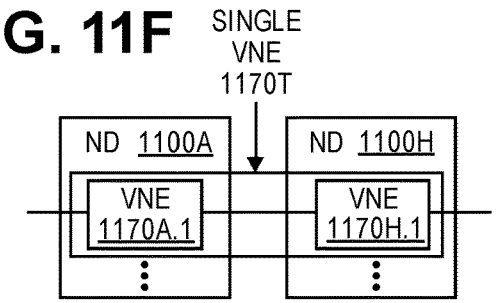
FIG. 11F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 11E and 11F respectively illustrate exemplary abstractions of NEs and VNEs that the network controller 1178 may present as part of different ones of the virtual networks 1192. FIG. 11E illustrates the simple case of where each of the NDs 1100A-H implements a single NE 1170A-H (see FIG. 11D), but the centralized control plane 1176 has abstracted multiple of the NEs in different NDs (the NEs 1170A-C and G-H) into (to represent) a single NE 11701 in one of the virtual network(s) 1192 of FIG. 11D, according to some embodiments of the invention. FIG. 11E shows that in this virtual network, the NE 11701 is coupled to NE 1170D and 1170F, which are both still coupled to NE 1170E.

FIG. 11F illustrates a case where multiple VNEs (VNE 1170A.1 and VNE 1170H.1) are implemented on different NDs (ND 1100A and ND 1100H) and are coupled to each other, and where the centralized control plane 1176 has abstracted these multiple VNEs such that they appear as a single VNE 1170T within one of the virtual networks 1192 of FIG. 11D, according to some embodiments of the invention. Thus, the abstraction of a NE or VNE can span multiple NDs.

While some embodiments of the invention implement the centralized control plane 1176 as a single entity (e.g., a single instance of software running on a single electronic device), alternative embodiments may spread the functionality across multiple entities for redundancy and/or scalability purposes (e.g., multiple instances of software running on different electronic devices).

Figure 12:
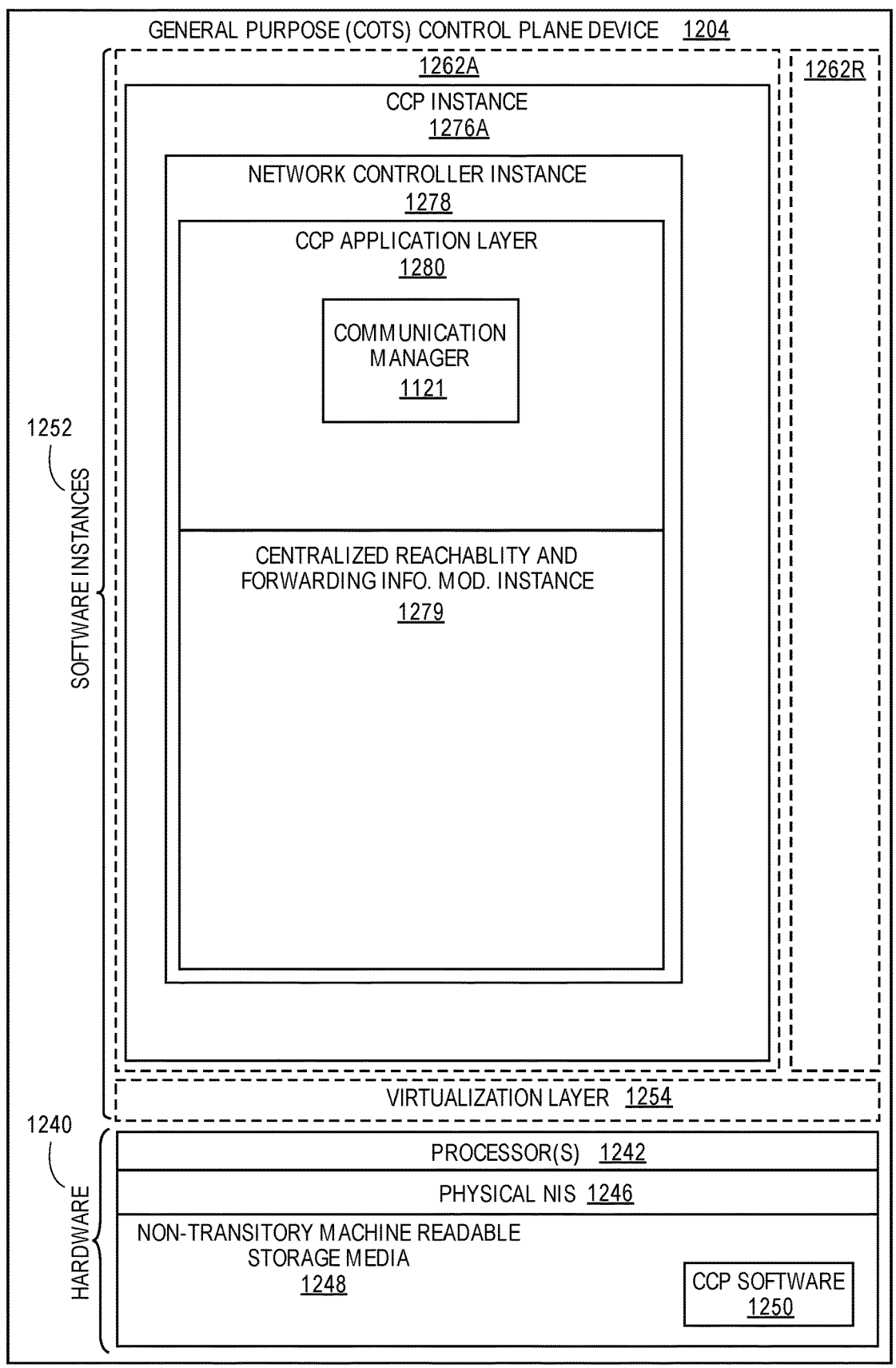
FIG. 12 illustrates a general purpose control plane device with centralized control plane (CCP) software 1250, according to some embodiments of the invention.

Similar to the network device implementations, the electronic device(s) running the centralized control plane 1176, and thus the network controller 1178 including the centralized reachability and forwarding information module 1179, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 12 illustrates, a general purpose control plane device 1204 including hardware 1240 comprising a set of one or more processor(s) 1242 (which are often COTS processors) and physical NIs 1246, as well as non-transitory machine readable storage media 1248 having stored therein centralized control plane (CCP) software 1250.

In embodiments that use compute virtualization, the processor(s) 1242 typically execute software to instantiate a virtualization layer 1254 (e.g., in one embodiment the virtualization layer 1254 represents the kernel of an operating system (or a shim executing on a base operating system) that allows for the creation of multiple instances 1262A-R called software containers (representing separate user spaces and also called virtualization engines, virtual private servers, or jails) that may each be used to execute a set of one or more applications; in another embodiment the virtualization layer 1254 represents a hypervisor (sometimes referred to as a virtual machine monitor (VMM)) or a hypervisor executing on top of a host operating system, and an application is run on top of a guest operating system within an instance 1262A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1240, directly on a hypervisor represented by virtualization layer 1254 (in which case the unikernel is sometimes described as running within a LibOS virtual machine), or in a software container represented by one of instances 1262A-R). Again, in embodiments where compute virtualization is used, during operation an instance of the CCP software 1250 (illustrated as CCP instance 1276A) is executed (e.g., within the instance 1262A) on the virtualization layer 1254. In embodiments where compute virtualization is not used, the CCP instance 1276A is executed, as a unikernel or on top of a host operating system, on the "bare metal" general purpose control plane device 1204. The instantiation of the CCP instance 1276A, as well as the virtualization layer 1254 and instances 1262A-R if implemented, are collectively referred to as software instance(s) 1252.

In some embodiments, the CCP instance 1276A includes a network controller instance 1278. The network controller instance 1278 includes a centralized reachability and forwarding information module instance 1279 (which is a middleware layer providing the context of the network controller 1178 to the operating system and communicating with the various NEs), and an CCP application layer 1280 (sometimes referred to as an application layer) over the middleware layer (providing the intelligence required for various network operations such as protocols, network situational awareness, and user—interfaces). At a more abstract level, this CCP application layer 1280 within the centralized control plane 1176 works with virtual network view(s) (logical view(s) of the network) and the middleware layer provides the conversion from the virtual networks to the physical view.

The centralized control plane 1176 transmits relevant messages to the data plane 1180 based on CCP application layer 1280 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1180 may receive different messages, and thus different forwarding information. The data plane 1180 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables. The application layer 1280 can include any of the components of the communication systems described herein including the communication manager 1281. The communication manager 1281 can implement the functions of the embodiments as described herein above.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1180, the packet (or a subset of the packet header and content) is typically forwarded to the centralized control plane 1176. The centralized control plane 1176 will then program forwarding table entries into the data plane 1180 to accommodate packets belonging to the flow of the unknown packet. Once a specific forwarding table entry has been programmed into the data plane 1180 by the centralized control plane 1176, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates the subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e., the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e., through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device to establish communication over a multi-operator maritime mesh network, the network device in a local network of a communication system of a first vessel in the maritime mesh network, the method comprising:

receiving a communication session request, via a mesh server of a second vessel, from a remote network device of the second vessel to access a remote service, the remote network device within the multi-operator maritime mesh network and the remote network device is subscribed to a different network operator than a network operator associated with the network device;

querying a subscriber database of the different network operator associated with the remote network device for a roaming agreement;

determining that the remote network device has the roaming agreement with-a the network operator associated with the network device; and establishing a communication session between the remote network device and the remote service, when determining that the remote network device has the roaming agreement with the network operator associated with the network device, the communication session being established is between the mesh server of the second vessel and a gateway of the different network operator.

2. The method of claim 1, wherein the remote network device is from a communication system of the second vessel connecting to the maritime mesh network.

3. The method of claim 1, wherein the subscriber database is a local copy in the maritime mesh network.

4. The method of claim 1, wherein the subscriber database is accessed at a terrestrial network connected to the maritime mesh network.

5. The method of claim 1, wherein the communication session being established between the mesh server of the second vessel and the gateway of the different network operator is a virtual private network (VPN) tunnel.

6. A network device to establish communication over a multi-operator maritime mesh network, the network device in a local network of a communication system of a first vessel in the maritime mesh network, the network device comprising:

a machine-readable medium having stored therein a communication manager; and a processor coupled to the machine-readable medium, the processor to execute the communication manager to cause the network device to:

receive a communication session request, via a mesh server of a second vessel, from a remote network device of the second vessel to access a remote service, the remote network device within the multi-operator maritime mesh network and the remote network device is subscribed to a different network operator than a network operator associated with the network device;

query a subscriber database of the different network operator associated with the remote network device for a roaming agreement;

determine that the remote network device has the roaming agreement with the network operator associated with the network device; and establish a communication session between the remote network device and the remote service, when determining that the remote network device has the roaming agreement with the network operator associated with the network device, the communication session being established is between the mesh server of the second vessel and a gateway of the different network operator.

7. The network device of claim 6, wherein the network device is configured to execute a plurality of virtual machines, the plurality of virtual machines implementing network function virtualization (NFV).

8. The network device of claim 6, wherein the remote network device is from a communication system of the second vessel connecting to the maritime mesh network.

9. The network device of claim 6, wherein the subscriber database is a local copy in the maritime mesh network.

10. The network device of claim 6, wherein the subscriber database is accessed at a terrestrial network connected to the maritime mesh network.

11. The network device of claim 6, wherein the communication session being established between the mesh server of the second vessel and the gateway of the different network operator is a virtual private network (VPN) tunnel.

\* \* \* \* \*